United States Patent
Chaponniere et al.

(10) Patent No.: US 10,986,000 B2
(45) Date of Patent: Apr. 20, 2021

(54) ENABLING NEW RADIO CELLULAR QUALITY OF SERVICE FOR NON-INTERNET PROTOCOL DATA SESSIONS

(71) Applicant: QUALCOMM Incorporated, San Diego, CA (US)

(72) Inventors: Lenaig Genevieve Chaponniere, La Jolla, CA (US); Ajith Tom Payyappilly, San Diego, CA (US); Satashu Goel, San Diego, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/913,745

(22) Filed: Mar. 6, 2018

(65) Prior Publication Data
US 2018/0324060 A1 Nov. 8, 2018

Related U.S. Application Data

(60) Provisional application No. 62/502,692, filed on May 7, 2017.

(51) Int. Cl.
*H04L 12/26* (2006.01)
*H04L 29/08* (2006.01)
(Continued)

(52) U.S. Cl.
CPC .......... *H04L 43/028* (2013.01); *H04L 67/141* (2013.01); *H04L 69/18* (2013.01);
(Continued)

(58) Field of Classification Search
CPC ........ H04W 80/04; H04W 8/26; H04L 12/56; H04L 2012/56; H04L 47/10; H04L 47/35;
(Continued)

(56) References Cited

U.S. PATENT DOCUMENTS

2003/0039259 A1* 2/2003 Madour ................. H04L 29/06
370/401
2009/0016282 A1* 1/2009 Gasparroni ............ H04L 45/24
370/329
(Continued)

FOREIGN PATENT DOCUMENTS

| EP | 3048763 A1 | 7/2016 |
| WO | 2014011008 A1 | 1/2014 |
| WO | 2016091298 A1 | 6/2016 |

OTHER PUBLICATIONS

Ericsson: "QoS: Clarifications and updates of Solution 2.1," 3GPP Draft; S2-166392_QOS_UPDATE_SOL_2_1, 3rd Generation Partnership Project (3GPP), Mobile Competence Centre; 650, Route Des Lucioles;F-06921 Sophia-Antipolis Cedex; France, vol. SA WG2, No. Reno, Nevada, USA; Nov. 14, 2016-Nov. 18, 2016, Nov. 14, 2016, 15 pages, XP051184951, Retrieved from the Internet: URL:http://www.3gpp.org/ftp/Meetings_3GPP_SYNC/SA2/Docs/ [retrieved on Nov. 14, 2016].
(Continued)

*Primary Examiner* — Brenda H Pham
(74) *Attorney, Agent, or Firm* — Qualcomm Incorporated

(57) ABSTRACT

Aspects of the disclosure relate to enabling new radio (NR) cellular quality of service (QoS) for non-internet protocol (IP) data sessions. In a particular aspect of the disclosure, a non-IP based protocol data unit (PDU) session is established, and a packet filter is selected based on at least one aspect of a data packet formatted in a non-IP format associated with the non-IP PDU session. A transmission of the data packet is then filtered according to the packet filter.

12 Claims, 15 Drawing Sheets

(51) Int. Cl.
*H04L 29/06* (2006.01)
*H04W 80/02* (2009.01)
*H04W 84/04* (2009.01)

(52) U.S. Cl.
CPC .............. *H04L 69/22* (2013.01); *H04W 80/02* (2013.01); *H04W 84/042* (2013.01)

(58) Field of Classification Search
CPC ......... H04L 47/30; H04L 47/32; H04L 47/24; H04L 47/70; H04L 47/6225; H04L 2012/5679; H04L 47/50; H04L 47/623; H04L 2012/5632; H04L 47/6295
USPC ..... 370/349, 389, 231, 235, 395.21, 395.41, 370/395.43
See application file for complete search history.

(56) References Cited

U.S. PATENT DOCUMENTS

| | | | | |
|---|---|---|---|---|
| 2014/0233380 | A1* | 8/2014 | Kim | H04W 28/24 370/230 |
| 2017/0359749 | A1* | 12/2017 | Dao | H04W 28/0268 |
| 2018/0014222 | A1* | 1/2018 | Song | H04W 28/0257 |
| 2018/0242205 | A1* | 8/2018 | Mildh | H04W 36/0016 |
| 2018/0324631 | A1* | 11/2018 | Jheng | H04L 1/1887 |

OTHER PUBLICATIONS

Ericsson: "QoS Enhancements for V2X Including Non-IP Data," 3GPP Draft; S2-161580_S2_114_V2X_QOS, 3rd Generation Partnership Project (3GPP), Mobile Competence Centre; 650, Route Des Lucioles; F-06921 Sophia-Antipolis Cedex; France, vol. SA WG2, No. Sophia Antipolis, FR; Apr. 11, 2016-Apr. 15, 2016, Apr. 4, 2016, 5 pages, XP051086561, Retrieved from the Internet: URL:http://www.3gpp.org/ftp/tsg_sa/WG2_Arch/TSGS2_114_Sophia_Antipolis/Docs/ [retrieved on Apr. 5, 2016].
Partial International Search Report—PCT/US2018/021397—ISA/EPO—dated Jun. 8, 2018.
3rd Generation Partnership Project; Technical Specification Group Core Network and Terminals; 3GPP system—Fixed Broadband Access Network Interworking; Stage 3 (Release 14), 3GPP Standard; Technical Specification; 3GPP TS 24.139, 3rd Generation Partnership Project (3GPP), Mobile Competence Centre; 650, Route Des Lucioles; F-06921 Sophia-Antipolis Cedex; France, vol. CT WG 1, No. V14.0.0, Mar. 17, 2017, XP051290584, [retrieved on Mar. 17, 2017], pp. 1-19.
CATT: "Clarifications and Updates for Interim Agreement of QoS", 3GPP Draft; S2-166968 WAS S2-166872 WAS S2-166638_CLARIFICATIONS_QOS, 3rd Generation Partnership Project (3GPP), Mobile Competence Centre; 650, Route Des Lucioles; F-06921 Sophia-Antipolis Cedex; France, vol. SA WG2, No. Reno, Nevada, USA; Nov. 14, 2016-Nov. 18, 2016 Nov. 21, 2016, XP051199938, Retrieved from the Internet: URL:http://www.3gpp.org/ftp/tsg_sa/WG2_Arch/TSGS2_118_Reno/Docs/ [retrieved on Nov. 21, 2016], 4pages.
International Search Report and Written Opinion—PCT/US2018/021397—ISA/EPO—dated Sep. 5, 2018.
Telecom Italia: "Enhancement of Service Data Flow filters", 3GPP Draft; S2-131644_UPCON_P_CR_CONG_MITIG_ENHANCED_SDF _FILTERS, 3rd Generation Partnership Project (3GPP), Mobile Competence Centre; 650, Route Des Lucioles; F-06921 Sophia-Antipolis Cedex; France, vol. SA WG2, No. Susan, South Korea; May 27, 2013-May 31, 2013 May 21, 2013, XP050708847, Retrieved from the Internet: URL:http://www.3gpp.org/ftp/tsg_sa/WG2_Arch/TSGS2_97_Susan/Docs/ [retrieved on May 21, 2013], 4 pages.

* cited by examiner

Reference Architecture

ENABLING NEW RADIO CELLULAR QUALITY OF SERVICE FOR NON-INTERNET PROTOCOL DATA SESSIONS

CROSS-REFERENCE TO RELATED APPLICATION(S)

This application claims priority to and the benefit of U.S. Provisional Patent Application No. 62/502,692, filed on May 7, 2017, the entire content of which is incorporated herein by reference as if fully set forth below in its entirety and for all applicable purposes.

TECHNICAL FIELD

The technology discussed below relates generally to wireless communication systems, and more particularly, to enabling new radio (NR) cellular quality of service (QoS) for non-internet protocol (IP) data sessions (e.g., Ethernet, unstructured, etc.).

INTRODUCTION

In a wireless communication network, a quality of service (QoS) may be provided to users of the network. A QoS mechanism generally controls parameters of the wireless network, such as its performance, its reliability, and its usability. These parameters may be determined according to certain metrics such as the coverage and accessibility of the network, and its call quality (especially audio and video quality). In $3^{rd}$ Generation Partnership Project (3GPP) and $4^{th}$ Generation (4G) cellular networks, a network can configure a user equipment (UE) to filter uplink (UL) user data packets so as to route them to different bearers which receive a different QoS. This is typically done by assigning one or more "packet filters", each with an associated evaluation precedence index, to the bearers. Before transmitting an UL user data packet, the UE checks whether the packet matches any of the packet filters configured by the network, in increasing order of evaluation precedence index, and sends the packet on the bearer associated with the packet filter for which there was a match.

Since up to Release 12, all data connections in 3GPP and 4G cellular networks were internet protocol (IP)-based, wherein the format of the packet filters (specified in 3GPP TS 24.008 subclause 10.5.6.12) relies on the contents of the data packet's IP header. Consequently, the packet filters may include one or more of the following criteria: Source IP address matches a certain value; Destination IP address matches a certain value; Source port number matches a certain value; Destination port number is within a certain range; Source port range matches is within a certain value; Protocol identifier/Next header type field matches a certain value; Security parameter index type matches a certain value; Type of service/Traffic class type matches a certain value; and/or Flow label type matches a certain value.

In fifth generation (5G) networks, data connections (also referred to as protocol data unit (PDU) sessions) of type "Ethernet" and "unstructured" are being introduced (See e.g., 3GPP TS 23.501). However, since user data packets for these PDU session types do not necessarily have IP headers, the current format of the packet filter does not allow for filtering of the corresponding packets to provide differentiated QoS. Accordingly, it would be desirable to provide a solution for enabling QoS within a PDU session of type "Ethernet" or "unstructured".

Moreover, in 5G the use of reflective QoS over cellular networks was introduced. When reflective QoS is activated, the UE has to self-construct UL packet filters based on received DL user data packets. To this end, although a mechanism for the UE to self-construct UL packet filters for IP data is generally known (See e.g., 3GPP TS 24.139 subclauses 5.2.3 and 5.2.4), no such procedure is specified for PDU sessions of type "Ethernet" or "unstructured". Accordingly, it would be desirable to provide a solution for self-constructing UL packet filters at the UE for PDU sessions of type "Ethernet" or "unstructured" when reflective QoS is enabled.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In the examples below, disclosed aspects relate to enabling new radio (NR) cellular quality of service (QoS) for non-internet protocol (IP) data sessions (e.g., Ethernet, unstructured, etc.). For instance, solutions are disclosed for how to extend the current packet filter format to enable QoS within a protocol data unit (PDU) session for non-IP based types (e.g., Ethernet, unstructured, etc.). Solutions are also disclosed for self-constructing packet filters at a user equipment (UE) for non-IP based PDU sessions when reflective QoS is enabled.

In one example, a method of wireless communication is disclosed. The method includes establishing a non-IP based PDU session, and selecting a packet filter based on at least one aspect of a data packet formatted in a non-IP format associated with the non-IP PDU session. The method then further includes filtering a transmission of the data packet according to the packet filter.

In a second example, a wireless communication device is disclosed, which includes a processor communicatively coupled to a memory, a transceiver, a communication circuitry, a selection circuitry, and a filter circuitry. For this example, the communication circuitry is configured to establish a non-IP based PDU session, whereas the selection circuitry is configured to select a packet filter based on at least one aspect of a data packet formatted in a non-IP format associated with the non-IP based PDU session. The filter circuitry is then configured to filter a transmission of the data packet according to the packet filter.

In a third example, an apparatus for wireless communication is disclosed. The apparatus includes means for establishing a non-IP based PDU session, and means for selecting a packet filter based on at least one aspect of a data packet formatted in a non-IP format associated with the non-IP based PDU session. The apparatus also includes means for filtering a transmission of the data packet according to the packet filter.

In a fourth example, non-transitory computer-readable medium storing computer-executable code, comprising code for causing a computer to perform various acts. For this example, such code includes code for causing the computer to establish a non-IP based PDU session, and code for causing the computer to select a packet filter based on at least one aspect of a data packet formatted in a non-IP format associated with the non-IP based PDU session. The code may also include code for causing the computer to filter a transmission of the data packet according to the packet filter.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
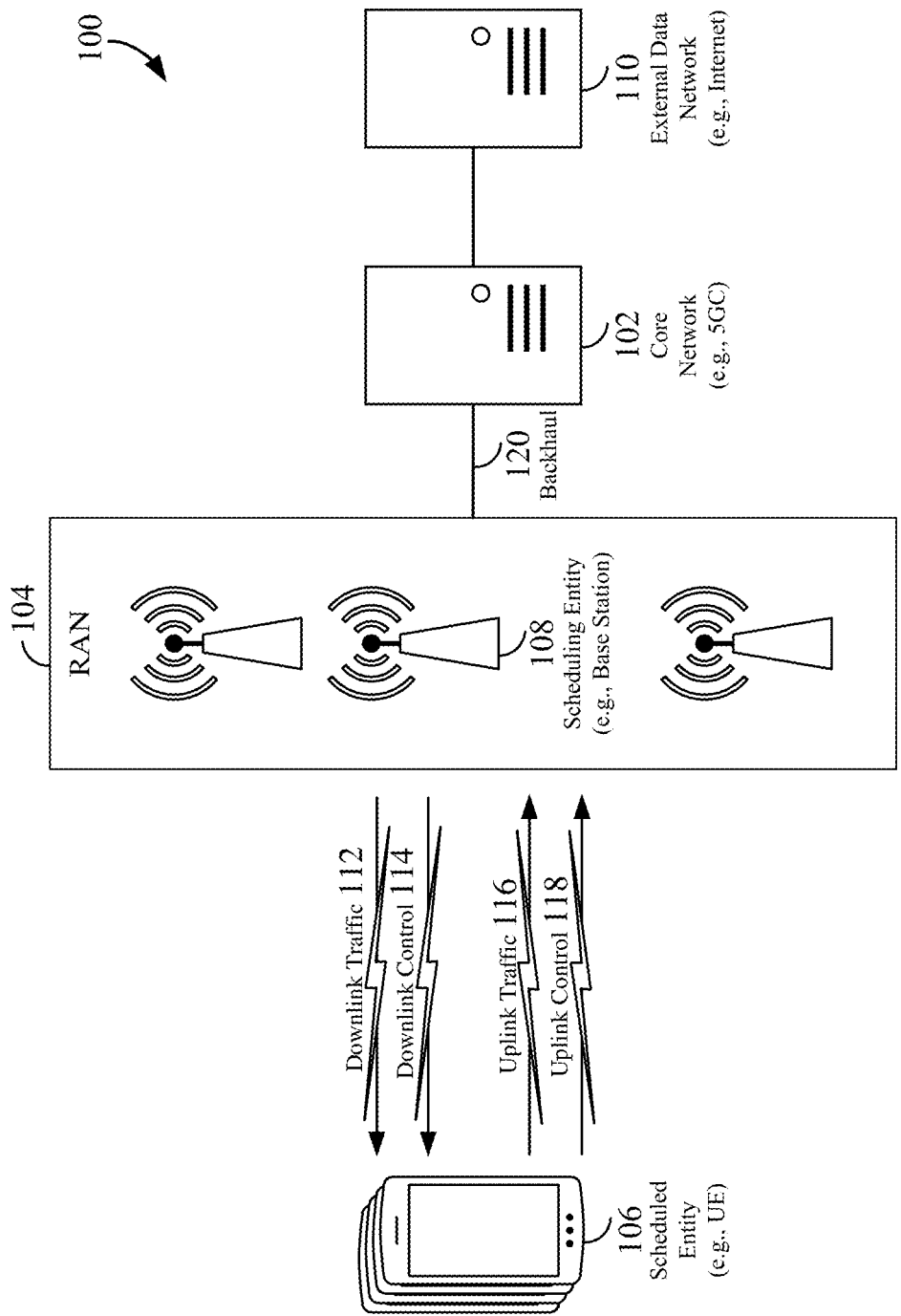
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As will discussed in more detail herein, the present disclosure includes aspects directed towards solutions for how to extend the current packet filter format to enable Quality of Service (QoS) within a protocol data unit (PDU) session for non-internet protocol (IP) based types (e.g., Ethernet, unstructured, etc.). For PDU sessions of type "Ethernet", for instance, it is contemplated that filtering may be based on the contents of an Ethernet frame header, wherein any of various parameters may be added to the packet filter. Aspects are also disclosed for how to prioritize a matching of packet filters based on criteria including the Ethernet frame header and/or an IP frame header (e.g., no priority, evaluate contents of the IP header only if there is no match for the Ethernet frame header, etc.). For PDU sessions of type "unstructured", since the format of the packets exchanged during a PDU session is not standardized (i.e., it is not possible to define packet filter components based on header contents), aspects are disclosed in which the mapping of a user data packet to a particular QoS treatment is not based on the contents of the packet itself, but rather on the application which generated the packet.

The present disclosure also includes aspects directed towards solutions for self-constructing packet filters at the UE for non-IP based PDU sessions when reflective QoS is enabled. For PDU sessions of type "Ethernet" and "unstructured", for instance, embodiments are disclosed in which the UE self-constructs uplink (UL) packet filters based on received downlink (DL) packets.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

RAB: radio access bearer. The service that an access stratum provides to a non-access stratum for transfer of user information between a UE and the core network.

QoS: quality of service. The collective effect of service performances which determine the degree of satisfaction of a user of a service. QoS is characterized by the combined aspects of performance factors applicable to all services, such as: service operability performance; service accessibility performance; service retainability performance; service integrity performance; and other factors specific to each service.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
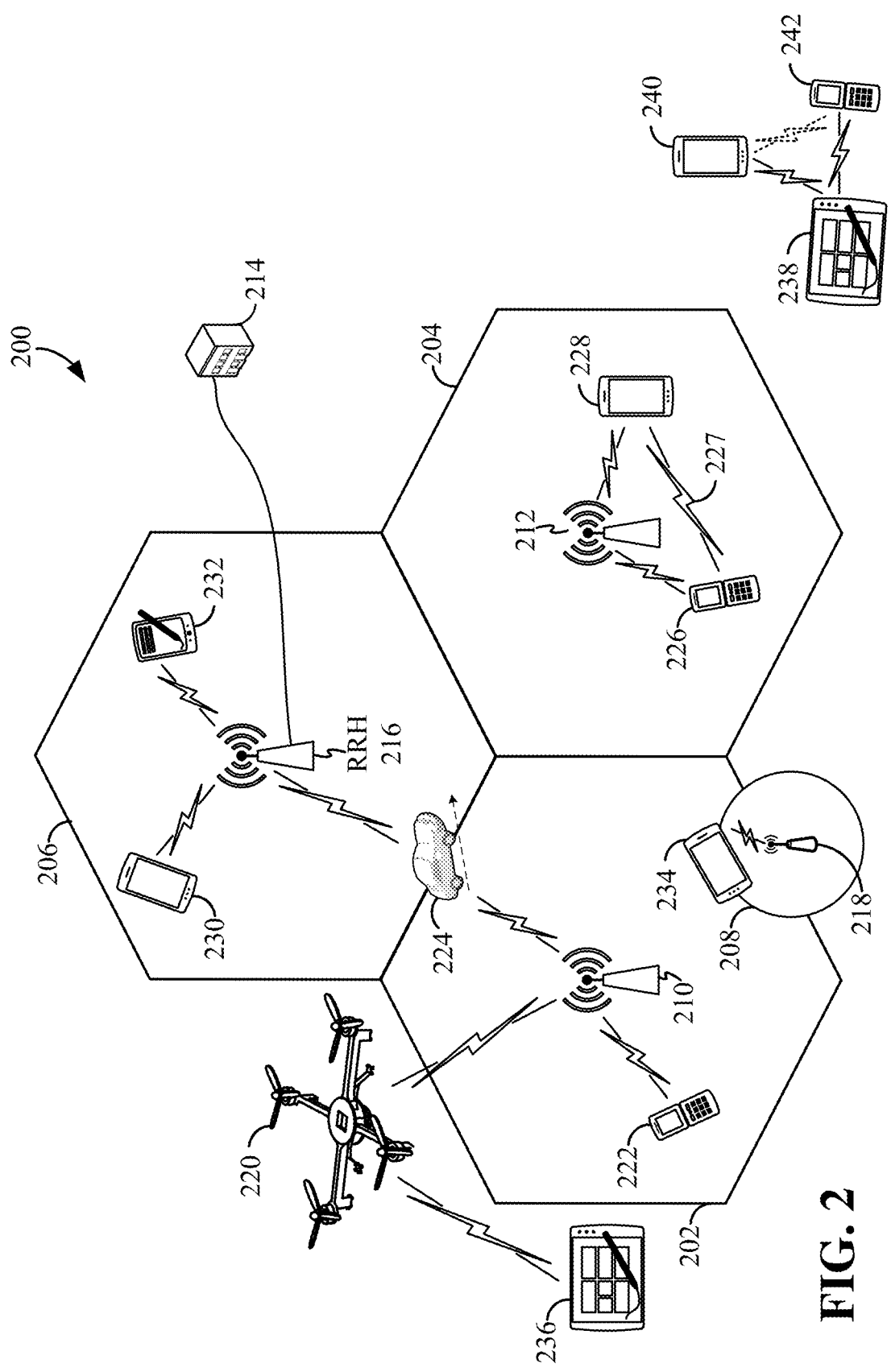
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
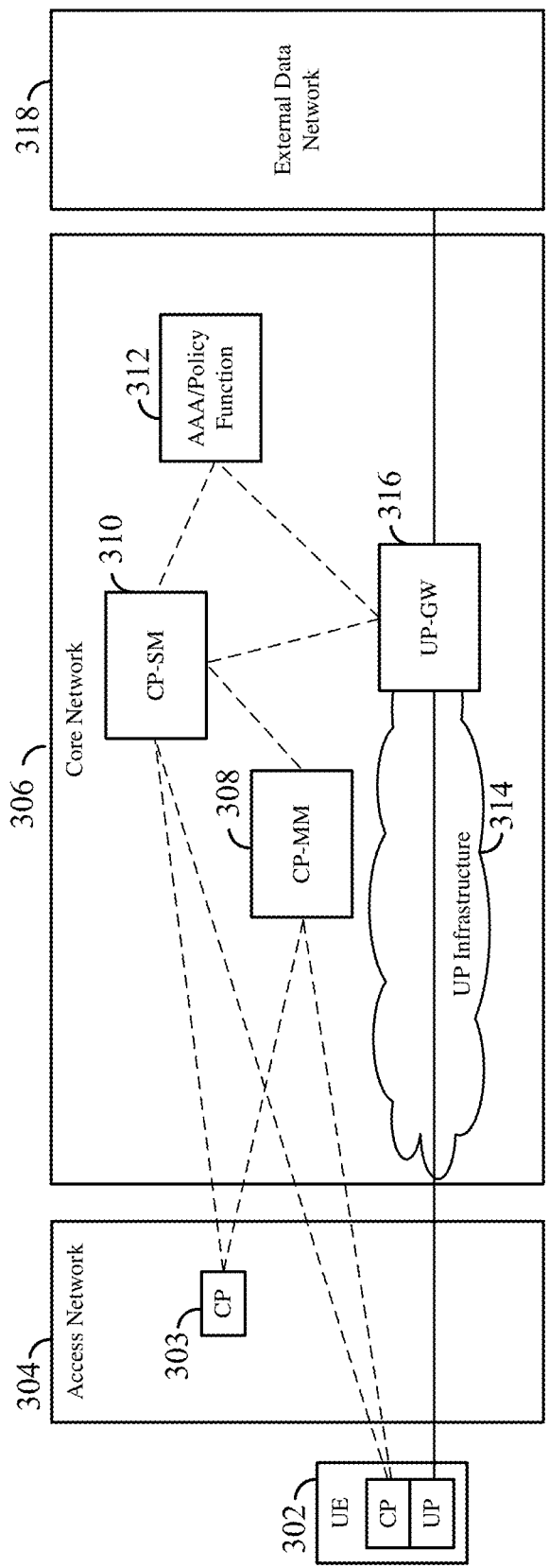
FIG. 3 is a block diagram illustrating certain aspects of an architecture for a next generation (e.g., fifth generation or 5G) wireless communication network.

Referring next to FIG. 3, a block diagram is provided illustrating various aspects of an architecture for a core network (CN) in a next generation (e.g., fifth generation or 5G) wireless communication network. As illustrated, features may include a UE 302 in communication with a core network 306 by way of an access network 304. In this illustration, any signal path between a UE and a CN is presumed to be passed between these entities by an access network, as represented by an illustrated signal path crossing the access network. Here, the access network 304 may be the access network 200 described above and illustrated in FIG. 2. In another example, the access network 304 may correspond to an LTE (eUTRAN) network, a wired access network, a combination of the above, or any other suitable access network or networks. In the description that follows, when reference is made to the access network (AN) or actions performed by the AN, it may be understood that such reference refers to one or more network nodes in the AN that is or are communicatively coupled to the CN (e.g., via a backhaul connection). As one non-limiting example, for clarity of description, such reference to the AN may be understood as referring to a base station. However, those of ordinary skill in the art will comprehend that this is may not always be the case, for example, as in certain 3G RANs where base stations are under the control or direction of centralized radio network controllers within their AN.

The UE 302 has both user plane (UP) and control plane (CP) functionality (and may have UE features discussed generally herein). In FIG. 3, CP signaling is indicated by dashed lines, and UP signaling is indicated by solid lines. The access network (AN) 304 also includes some CP functionality, illustrated with the CP block 303 at the AN 304, but the majority of the CP functionality is at the CN 306. Specifically, the CN 306 includes a control plane mobility management function (CP-MM) 308 and a control plane session management function (CP-SM) 310.

The CP-MM 308 establishes and maintains the mobility management context for a device (e.g., the UE 302) that attaches to the CN 306 over one or more access technologies. The CP-SM 310 establishes, maintains, and terminates data network (DN) sessions and data sessions in the next generation system architecture, including establishing these sessions on demand. The CP-SM 310 further decides the quality of service (QoS) for a UE, for a DN session and/or a data session.

An authentication, authorization, and accounting (AAA) server/policy function (PF) block 312 acts as a profile repository and authentication server. The AAA/policy function block 312 may store a subscriber profile and subscriber credentials, and may store and make decisions about policies (e.g. a QoS policy) to be applied for a UE for a DN session and/or a data session.

A user plane (UP) infrastructure entity 314 represents any suitable communication infrastructure in the CN 306 that delivers data between the AN 304, a user plane gateway (UP-GW) 316, and an external data network 318. The UP-GW 316 may be communicatively coupled with the CP-SM 310 to configure the UP connection over the CN 306. The external data network may be any suitable data network, including but not limited to the Internet, an IP multimedia subsystem (IMS) network, etc.

In the present disclosure, when reference is made to a core network or CN, it may be presumed that such reference is intended to mean any of the nodes within the CN, unless specific reference to a particular node is made.

When the UE 302 establishes connectivity with the CN 306, there are generally two different types of sessions that may be established: a data network session, and a data session. In some examples, a data session may equivalently be referred to as a packet data unit (PDU) session.

A data network (DN) session is a logical context, or a set of context information in various entities that provides a framework for connectivity between a local endpoint in the UE 302 (e.g., a web browser) and a remote endpoint in the external data network 318 (e.g., an IMS network, the Internet, dedicated networks, a Web server in a remote host, etc.). The DN session contains state information relating to various entities, such as the UE, the AN, the CN, gateways, etc., and may be served by multiple UP-GWs in one or more CNs. A DN session may contain one or more data sessions.

A data session (also referred to as a PDU session, a data flow, or a flow) is a logical context in a UE that enables communication between a local endpoint in the UE (e.g. a web browser) and a remote endpoint in the external data network 318 (e.g. a web server in a remote host). A data session may be an IP session or a non-IP session (e.g., Ethernet traffic). Within the present disclosure, any references to packets or PDUs (protocol data units) are interchangeable and are meant to refer to either an IP packet or a non-IP PDU.

Figure 4:
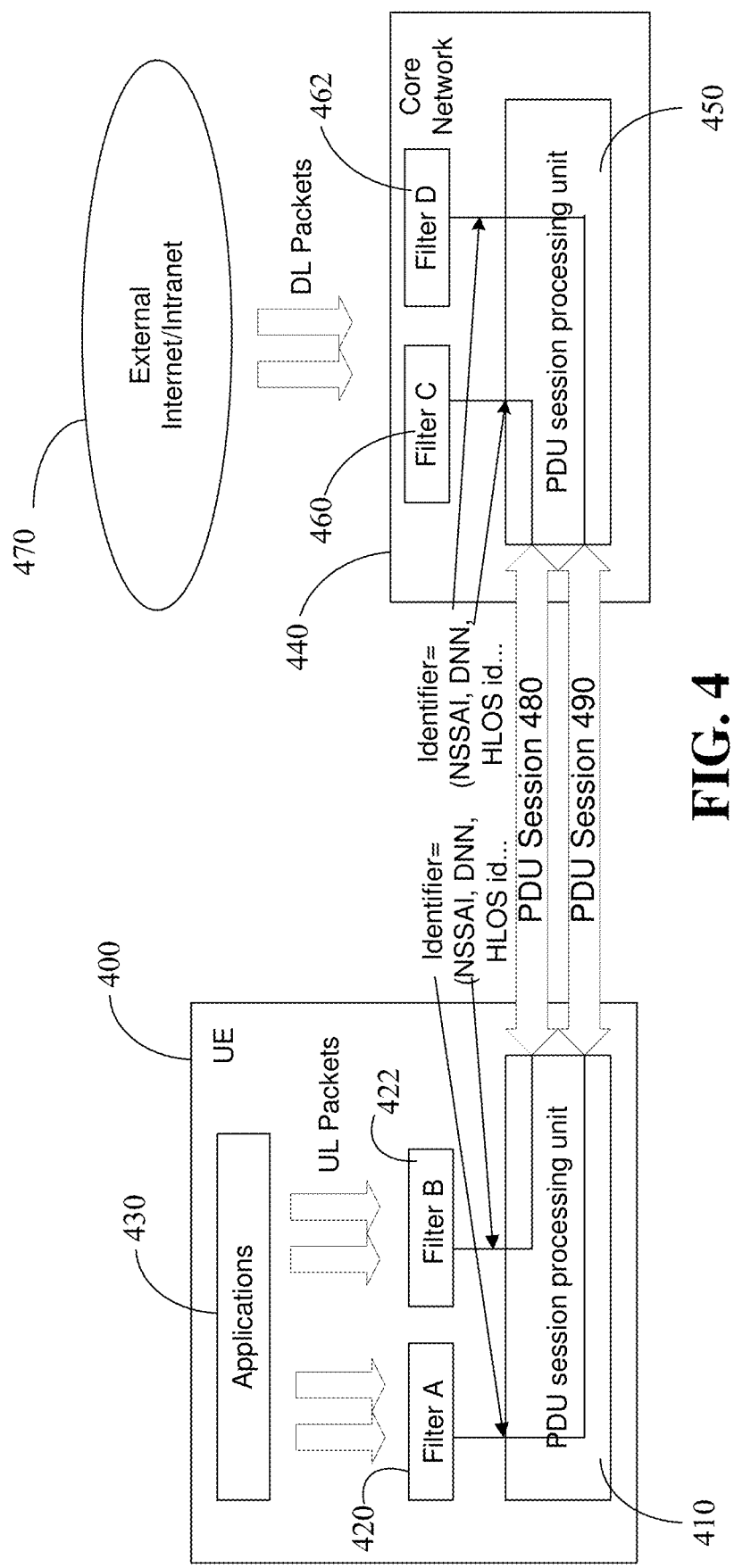
FIG. 4 is a block diagram illustrating an exemplary system that facilitates filtering data packets in accordance with some aspects of the present disclosure.

Referring next to FIG. 4, a block diagram is provided illustrating an exemplary system that facilitates filtering data packets in accordance with some aspects of the present disclosure. As illustrated, a user equipment (UE) 400 is communicatively coupled to a core network (CN) 440 via a plurality of PDU sessions (e.g., PDU sessions 480, 490), wherein packet filters (e.g., packet filters 420, 422, 460, 462) are associated with a particular PDU session (e.g., PDU sessions 480, 490). To facilitate filtering uplink (UL) data packets on the UE 400, the CN 440 may be configured to send a list of packet filters to the UE 400 when establishing a PDU session (e.g., PDU sessions 480, 490), or the UE 400 may be configured to self-construct the packet filters 420, 422 (e.g., in case of reflective QoS). As illustrated, it is generally assumed that the UL data packets are received from an application layer 430 of the UE 400, as shown. The UE 400 then utilizes aspects of the UL packet to match a particular packet filter with a corresponding PDU session (e.g., packet filter 420 with PDU session 490, or packet filter 422 with PDU session 480), wherein the UL packet is filtered by a packet filter (e.g., packet filter 420 or 422) in a manner that is transparent to the PDU session processing unit 410.

When filtering downlink (DL) data packets on the CN 440, it is contemplated that a similar procedure is used. Here, however, it is assumed that the DL data packets are received from an external internet/intranet 470, as shown, rather than the UL data packets received from the application layer 430. The CN 440 then utilizes aspects of the DL packet to match a particular packet filter with a corresponding PDU session (e.g., packet filter 460 with PDU session 480, or packet filter 462 with PDU session 490), wherein the DL packet is filtered by a packet filter (e.g., packet filter 460 or 462) in a manner that is transparent to the PDU session processing unit 450.

Extension of Packet Filter for "Ethernet" PDU Session Type

As previously discussed, aspects disclosed herein include solutions for how to extend the current packet filter format to enable Quality of Service (QoS) within a protocol data unit (PDU) session of type "Ethernet". Here, since Ethernet frames can carry internet protocol (IP) data, it is contemplated that the existing packet filter components specified in TS 24.008 subclause 10.5.6.12 may be included in a packet filter (e.g., packet filters 420, 422, 460, 462) for a PDU session of type "Ethernet". Accordingly, it is further contemplated that filtering may be based on the contents of the Ethernet frame header, wherein any of various parameters may be added to the packet filter (e.g., packet filters 420, 422, 460, 462). For instance, the packet filter (e.g., packet filters 420, 422, 460, 462) may be configured to include any of the following parameters: Destination MAC address; Source MAC address; VLAN identifier (VID); 802.1Q PCP (indicating the packet priority); and/or Ethertype.

In a particular aspect disclosed herein, it is thus contemplated that content included in both an Ethernet frame header and an IP header may be used to select a corresponding packet filter. For instance, an example is disclosed in which content extrapolated from an Ethernet frame header and content extrapolated from an IP header each have the same level of priority. Moreover, for this particular example, criteria in a filter corresponding to content extrapolated from both an Ethernet frame header and an IP header would have to be met, in no particular priority order, for a match to be declared.

In another example, a two-level hierarchy is used, wherein the criteria in a filter corresponding to content extrapolated from an Ethernet frame header is evaluated before the criteria corresponding to content extrapolated from an IP header. Namely, it is contemplated that the UE (e.g., UE 400) and CN (e.g., CN 440) may be configured to evaluate the contents of an IP header only if the contents of an Ethernet frame header match the filter.

Extension of Packet Filter for "Unstructured" PDU Session Type

As previously discussed, aspects are also disclosed for how to extend the current packet filter format to enable Quality of Service (QoS) within a protocol data unit (PDU) session of type "unstructured". Here, since the format of packets exchanged during a PDU session of type "unstructured" is not standardized, it should be noted that defining packet filter components based on header contents, for example, may not be possible.

One possible solution disclosed herein is to enable mapping of a user data packet to a particular QoS treatment based on the application that generated the packet, rather than the contents of the packet itself. In this case, the packet filter (e.g., packet filters 420, 422, 460, 462) may include one or more application identifiers (e.g OS Id+OS App Id). Within such embodiment, a modem in the UE (e.g., UE 400) may be configured to add a tag with an application identifier to each user data packet received from the application layer (e.g., application layer 430), based on information provided by the high level operating system (HLOS). Alternatively, the HLOS may be configured to tag each user data packet passed to the modem for transmission with an application identifier. Similarly, on a CN (e.g., CN 440), such tagging may be performed 1) by a network layer routing the downlink data packets based on information provided by an application layer, or 2) by an application layer, wherein the filtering comprises transmitting the downlink data packet tagged with the application identifier from the application layer to a network layer routing the downlink data packet.

In another disclosed solution, rather than using packet filters, the use of a specific access point name (APN) (also known as a Data Network Name (DNN) in 5G systems) is requested when establishing a data connection for a specific service or application. Within such example, all user data packets for the specific service or application would then be transmitted over the data connection to the specific APN, and the network would then apply a specific QoS treatment based on the APN associated with the data connection.

Reflective QoS for PDU Session of Type "Ethernet"

Aspects are also disclosed for enabling reflective Quality of Service (QoS) for a protocol data unit (PDU) session of type "Ethernet". In a particular embodiment, if reflective QoS is enabled in a PDU session of type "Ethernet", it is proposed that the UE (e.g., UE 400) self-construct packet filters (e.g., packet filters 420, 422) based on received downlink (DL) data packets. For instance, when the UE receives a DL data packet, it is contemplated that the UE shall check whether this packet maps to an existing uplink (UL) packet filter (e.g., packet filters 420, 422). If no matching UL packet filter is found, the UE shall create a new packet filter with any of various components. For instance, it is contemplated that such components may include: a destination MAC address component set to the source MAC address of the received DL packet; a source MAC address component set to the destination MAC address of the received DL packet; if an 802.1Q tag is included in the received DL packet, a VID component set to the VID of the received DL packet; if an 802.1Q tag is included in the received DL packet, an 802.1Q priority component set to the 802.1Q priority of the received DL packet; if the Ethertype field of the received DL packet is set to a value of 1536 or above, an Ethertype component set to the Ethertype of the received DL packet; and/or if the Ethertype field of the Ethernet frame header indicates that the data carried in the Ethernet frame is IP data, the UE shall also add to the UL packet filter IP-specific components based on the contents of the DL user data IP header as specified in TS 24.139 subclause 5.2.4.

In another aspect of the disclosure, it is contemplated that a UE may then be configured to associate the new UL packet filter with a time stamp. For instance, if a matching UL filter is found, the UE may be configured to update the time stamp of the matching UL packet filter. The UE may also be configured to delete packet filters based on their timestamp, wherein how long the packet filters should be kept may be UE-implementation specific.

As previously stated, a packet filter may be selected based on the contents of both an IP header and an Ethernet frame header. In a particular example, such contents have the same level of priority and are thus all included in the same packet filter associated with a single evaluation precedence index. Alternatively, a two-level hierarchy is contemplated, wherein the filter components based on the contents of the Ethernet frame header are included in a first packet filter with a certain evaluation precedence index, and wherein the filter components based on the contents of the IP headers are included in a second packet filter with a higher value of evaluation precedence index than the first filter (i.e., so that the UE checks on the contents of the IP header only if the contents of the Ethernet frame header match the filter).

Reflective QoS for PDU Session of Type "Unstructured"

Aspects are also disclosed for enabling reflective Quality of Service (QoS) for a protocol data unit (PDU) session of type "unstructured". In a particular embodiment, if reflective QoS is enabled in a PDU session of type "unstructured", it is proposed that the UE (e.g., UE 400) self-construct packet filters (e.g., packet filters 420, 422) based on received downlink (DL) data packets. For instance, when the UE receives a DL data packet, it is contemplated that the UE shall check whether this packet maps to an existing uplink (UL) packet filter (e.g., packet filters 420, 422). If no matching UL packet filter is found, the UE shall create a new packet filter with an application identifier set to the application identifier of the application that generated the DL data packet.

In another aspect of the disclosure, it is contemplated that a UE may then be configured to associate the new UL packet filter with a time stamp. For instance, if a matching UL filter is found, the UE may be configured to update the time stamp of the matching UL packet filter. The UE may also be configured to delete packet filters based on their timestamp, wherein the length of time that packet filters are kept may be UE-implementation specific.

In a particular example, the determination of the application which generated the DL data packet is performed by a modem in the UE. Alternatively, the determination of the application that generated the DL data packet is performed by the high level operating system (HLOS) in the UE and indicated to the modem by the HLOS.

Exemplary Scheduling Entity

Figure 5:
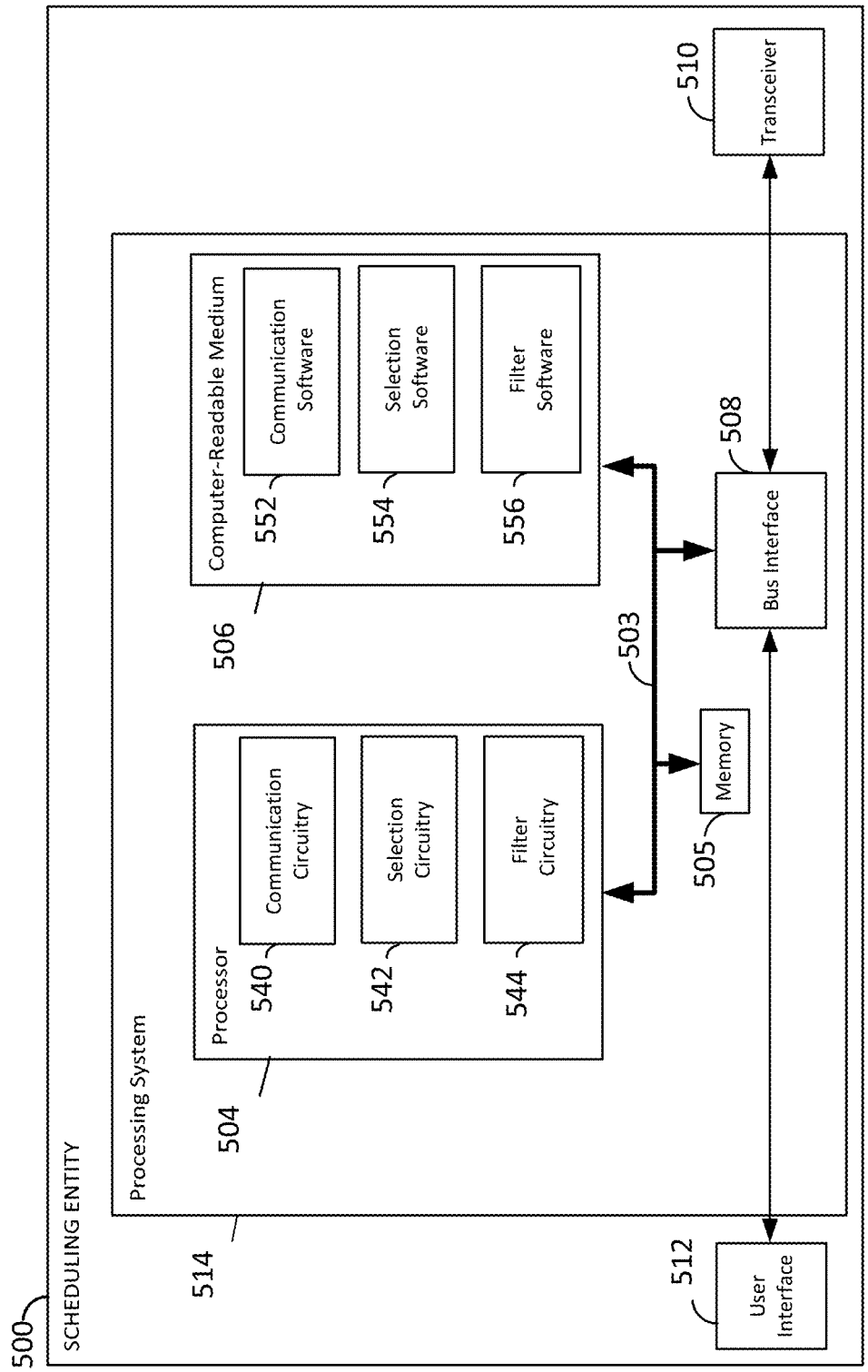
FIG. 5 is a block diagram illustrating an example of a hardware implementation for a scheduling entity apparatus employing a processing system in accordance with some aspects of the present disclosure.

FIG. 5 is a block diagram illustrating an example of a hardware implementation for a scheduling entity 500 employing a processing system 514. For example, the scheduling entity 500 may be a user equipment (UE) as illustrated in any one or more of the FIGS. included herein. In another example, the scheduling entity 500 may be a base station as illustrated in any one or more of the FIGS. included herein.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes and procedures disclosed herein.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided.

In some aspects of the disclosure, the processor 504 may include a communication circuitry 540 configured for various functions, including, for example, to establish a non-internet protocol (IP) based protocol data unit (PDU) session with a scheduled entity (e.g., UE 400, scheduled entity 1000, etc.). As illustrated, the processor 504 may also include a selection circuitry 542 configured for various functions. For instance, the selection circuitry 542 may be configured to select a packet filter based on at least one aspect of a downlink (DL) data packet formatted in a non-IP format associated with the non-IP based PDU session. The processor 504 may further include filter circuitry 544 configured for various functions, including, for example, to filter a transmission of the DL data packet to a scheduled entity (e.g., UE 400, scheduled entity 1000, etc.) according to the packet filter. To this end, it should be appreciated that, the combination of the communication circuitry 540, the selection circuitry 542, and the filter circuitry 544 may be configured to implement one or more of the functions described herein.

Figure 6:
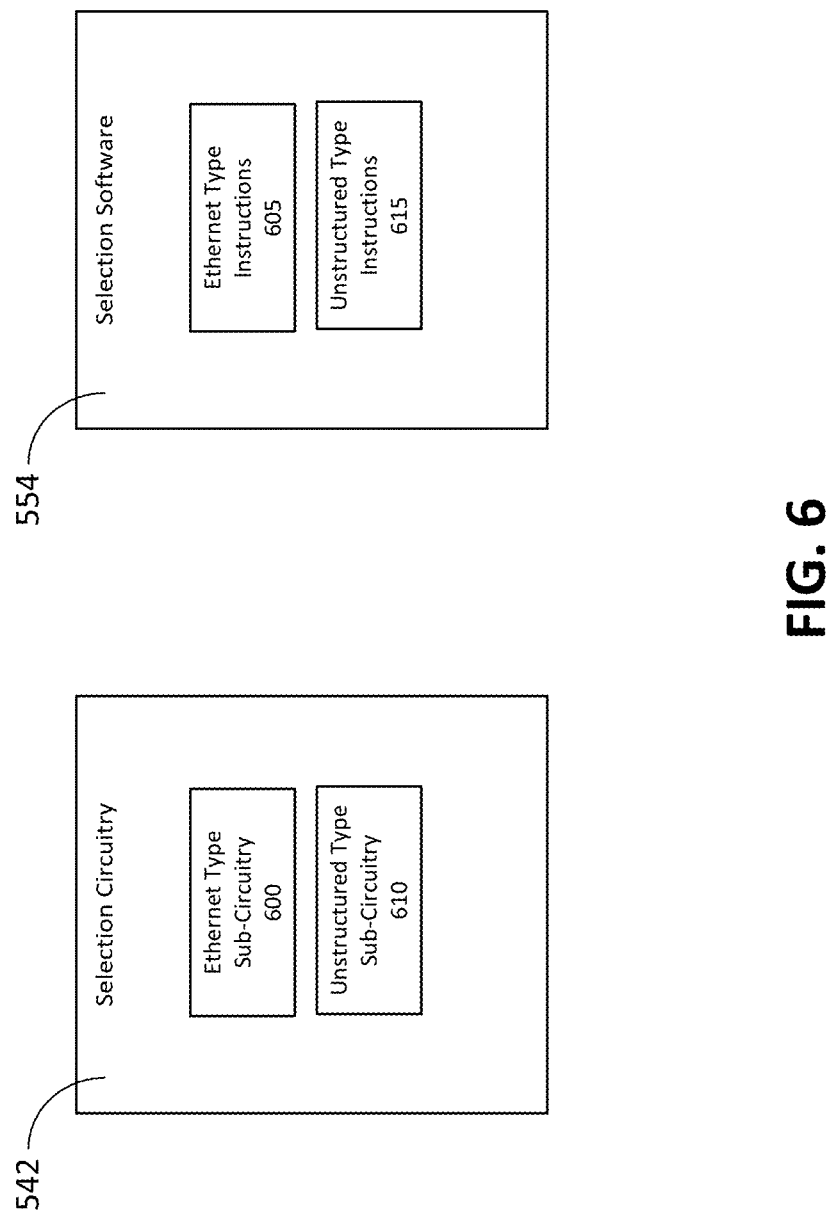
FIG. 6 is a block diagram illustrating exemplary sub-components of the selection circuitry and software illustrated in FIG. 5.

It should be appreciated that various other aspects of scheduling entity 500 are also contemplated. For instance, to facilitate the selection of packet filters when the non-IP based PDU session is an Ethernet based PDU session such that the DL data packet to be filtered is formatted in an Ethernet format, it is contemplated that the selection circuitry 542 may comprise Ethernet type sub-circuitry 600, as illustrated in FIG. 6. In this example, the Ethernet type sub-circuitry 600 may be configured to select a packet filter based on content included in an Ethernet frame header of the DL data packet. Also, because an Ethernet based PDU session may include IP data, it is further contemplated that the Ethernet type sub-circuitry 600 may be further configured to select a packet filter based on content included in an IP header of the data packet. To this end, it should be appreciated that the filter components based on the contents of an IP header and the filter components based on the contents of an Ethernet frame header may each have the same level of priority (i.e., all criteria in the filter would have to be met, in no particular priority order, for a match to be declared). Alternatively, if a data packet associated with an Ethernet based PDU session includes IP data, the Ethernet type sub-circuitry 600 may be configured to evaluate content included in an IP header of the data packet only if at least a portion of the content included in the Ethernet frame header of the data packet corresponds to a matching packet filter.

With respect to filtering DL data packets having an Unstructured format during an Unstructured based PDU session, various aspects are also contemplated. For instance, to facilitate the selection of packet filters during such an Unstructured based PDU session, it is contemplated that the selection circuitry 542 may comprise Unstructured type sub-circuitry 610, as illustrated in FIG. 6. In a particular example, the Unstructured type sub-circuitry 610 is configured to select a packet filter based on an identifier associated with an application that generated the DL data packet to be filtered. For instance, the Unstructured type sub-circuitry 610 may be further configured to facilitate a tagging of the DL data packet with such identifier, wherein the tagging may be performed by any of various components. For example, the Unstructured type sub-circuitry 610 may be coupled to a modem configured to perform the tagging based on information provided by a high level operating system (HLOS). Alternatively, the Unstructured type sub-circuitry 610 may be coupled to an HLOS configured to perform the tagging, wherein the HLOS is further configured to transmit the tagged DL data packet to a modem.

In yet another example directed towards unstructured PDU sessions, it is contemplated that an APN may be used. Within such example, the filtering performed by the filter circuitry 544 comprises requesting an APN when establishing a data connection, wherein the APN corresponds to a particular service or application, and subsequently transmitting DL data packets associated with the particular service or application to the APN.

Referring back to FIG. 5, the processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may include communication software 552 configured for various functions, including, for example, to establish a non-IP based PDU session with a scheduled entity (e.g., UE 400, scheduled entity 1000, etc.). As illustrated, the computer-readable storage medium 506 may also include selection software 554 configured for various functions. For instance, the selection software 554 may be configured to select a packet filter based on at least one aspect of a DL data packet formatted in a non-IP format associated with the non-IP based PDU session. The computer-readable storage medium 506 may further include filter software 556 configured for various functions, including, for example, to filter a transmission of the DL data packet to a scheduled entity (e.g., UE 400, scheduled entity 1000, etc.) according to the packet filter.

It should be appreciated that various other aspects of computer-readable storage medium 506 are also contemplated. For instance, to facilitate the selection of packet filters when the non-IP based PDU session is an Ethernet based PDU session such that the DL data packet to be filtered is formatted in an Ethernet format, it is contemplated that the selection software 554 may comprise Ethernet type instructions 605, as illustrated in FIG. 6. In this example, the Ethernet type instructions 605 may include instructions for selecting a packet filter based on content included in an Ethernet frame header of the DL data packet. Also, because an Ethernet based PDU session may include IP data, it is further contemplated that the Ethernet type instructions 605 may be further include instructions for selecting a packet filter based on content included in an IP header of the data packet. To this end, it should be appreciated that the filter components based on the contents of an IP header and the filter components based on the contents of an Ethernet frame header may each have the same level of priority (i.e., all criteria in the filter would have to be met, in no particular priority order, for a match to be declared). Alternatively, if a data packet associated with an Ethernet based PDU session includes IP data, the Ethernet type instructions 605 may include instructions for evaluating content included in an IP header of the data packet only if at least a portion of the content included in the Ethernet frame header of the data packet corresponds to a matching packet filter.

With respect to filtering DL data packets having an Unstructured format during an Unstructured based PDU session, various aspects are also contemplated. For instance, to facilitate the selection of packet filters during such an Unstructured based PDU session, it is contemplated that the selection software 554 may comprise Unstructured type instructions 615, as illustrated in FIG. 6. In a particular example, the Unstructured type instructions 615 include instructions for selecting a packet filter based on an identifier associated with an application that generated the DL data packet to be filtered. For instance, the Unstructured type instructions 615 may include instructions to facilitate a tagging of the DL data packet with such identifier, wherein the tagging may be performed by any of various components. For example, the Unstructured type instructions 615 may include instructions for configuring a modem to perform the tagging based on information provided by a high level operating system (HLOS). Alternatively, the Unstructured type instructions 615 may include instructions for configuring an HLOS to perform the tagging, wherein the HLOS is further configured to transmit the tagged DL data packet to a modem.

In yet another example directed towards unstructured PDU sessions, it is contemplated that an APN may be used. Within such example, the filtering facilitated by the filter software 556 comprises requesting an APN when establishing a data connection, wherein the APN corresponds to a particular service or application, and subsequently transmitting DL data packets associated with the particular service or application to the APN.

In a particular configuration, it is also contemplated that the scheduling entity 500 includes means for establishing a non-IP based PDU session with a scheduled entity (e.g., UE 400, scheduled entity 1000, etc.), means for selecting a packet filter based on at least one aspect of a DL data packet formatted in a non-IP format associated with the non-IP based PDU session, and means for filtering a transmission of the DL data packet to the scheduled entity (e.g., UE 400, scheduled entity 1000, etc.) according to the packet filter. In one aspect, the aforementioned means may be the processor(s) 504 configured to perform the functions recited by the aforementioned means. In another aspect, the aforementioned means may be a circuit or any apparatus configured to perform the functions recited by the aforementioned means.

Figure 7:
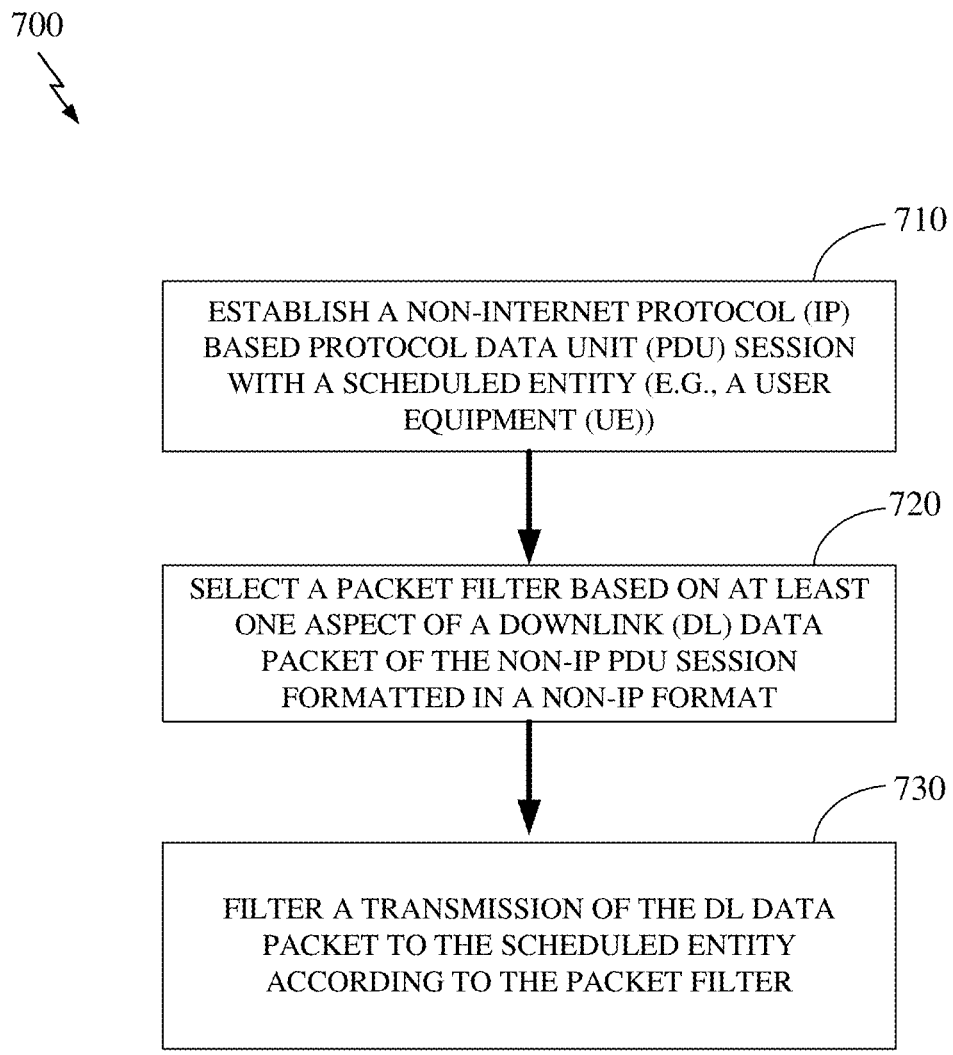
FIG. 7 is a flow chart illustrating an exemplary process for filtering a downlink data packet in accordance with some aspects of the present disclosure.
Figure 8:
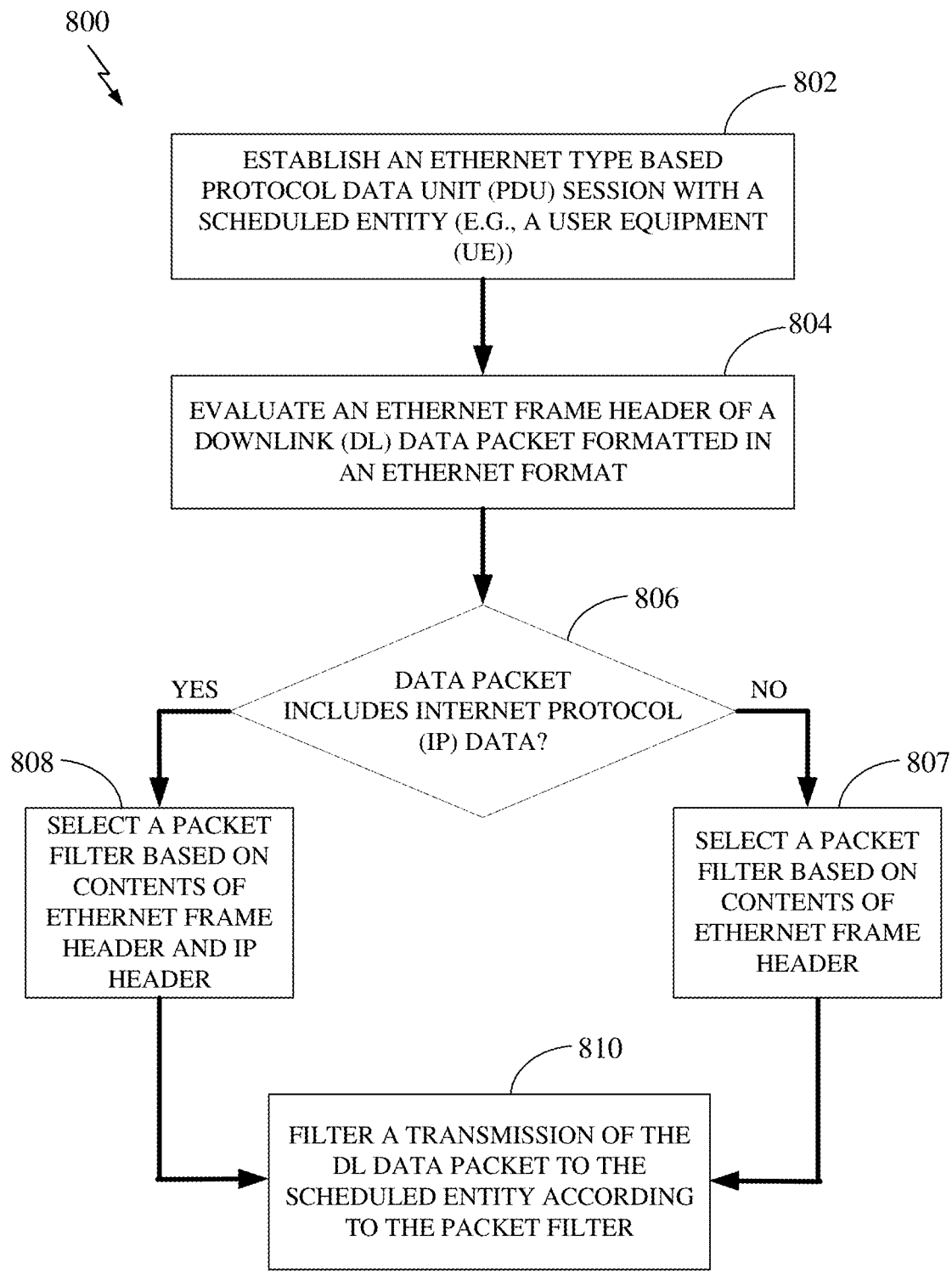
FIG. 8 is a flow chart illustrating an exemplary process for filtering an Ethernet type downlink data packet in accordance with some aspects of the present disclosure.
Figure 9:
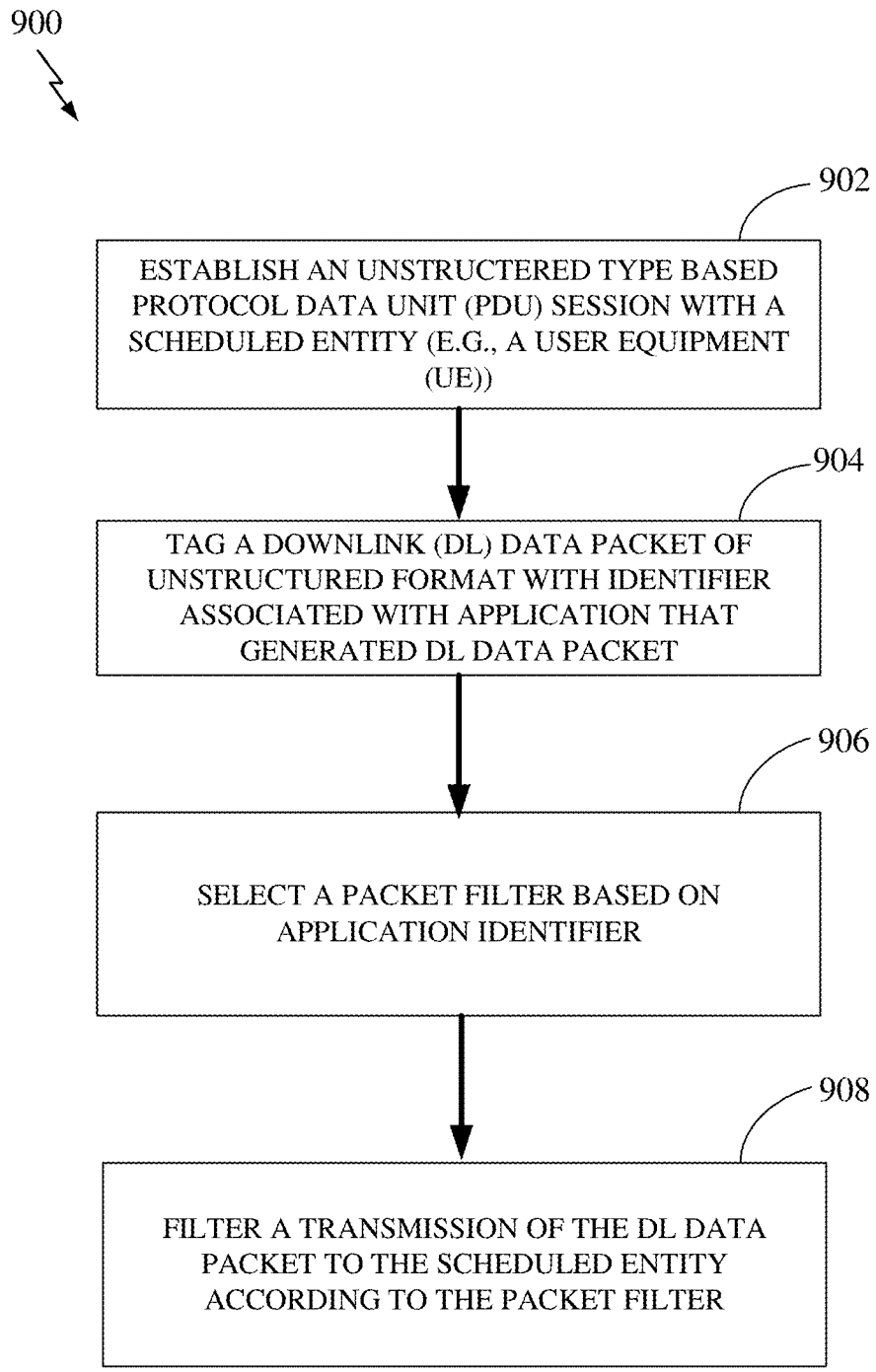
FIG. 9 is a flow chart illustrating an exemplary process for filtering an Unstructured type downlink data packet in accordance with some aspects of the present disclosure.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described herein and utilizing, for example, the processes and/or algorithms described in relation to FIGS. 7-9.

In FIG. 7, a flow chart is provided, which illustrates an exemplary process for filtering a DL data packet according to some aspects of the disclosure. As described below, some or all illustrated features may be omitted in a particular implementation within the scope of the present disclosure, and some illustrated features may not be required for implementation of all embodiments. In some examples, the process 700 may be carried out by the scheduling entity 500 illustrated in FIG. 5. In some examples, the process 700 may be carried out by any suitable apparatus or means for carrying out the functions or algorithm described below.

Process 700 begins at block 710 with the scheduling entity 500 establishing a non-IP based PDU session with a scheduled entity (e.g., UE 400, scheduled entity 1000, etc.). Process 700 then proceeds to block 720 where the scheduling entity 500 selects a packet filter based on at least one aspect of a DL data packet of the non-IP PDU session formatted in a non-IP format. At block 730, process 700 then concludes with the scheduling entity 500 filtering a transmission of the DL data packet to the scheduled entity (e.g., UE 400, scheduled entity 1000, etc.) according to the packet filter.

Referring next to FIG. 8, a flow chart is provided, which illustrates an exemplary process for filtering an Ethernet type DL data packet according to some aspects of the disclosure. Similar to process 700, it should be appreciated that process 800 may be carried out by the scheduling entity 500 illustrated in FIG. 5, and/or process 800 may be carried out by any suitable apparatus or means for carrying out the functions or algorithm described below.

Process 800 begins at block 802 with the scheduling entity 500 establishing an Ethernet type based PDU session with a scheduled entity (e.g., UE 400, scheduled entity 1000, etc.). Process 800 then proceeds to block 804 where the scheduling entity 500 evaluates an Ethernet frame header of a DL data packet formatted in an Ethernet format, and subsequently to block 806 where a determination is made as to whether the DL data packet includes IP data.

If the DL data packet indeed includes IP data, process 800 proceeds to block 808 where the scheduling entity 500 selects a packet filter based on the contents of the Ethernet frame header and the IP header. Otherwise, if the DL data packet does not include IP data, process 800 proceeds to block 807 where the scheduling entity 500 selects a packet filter based on the contents of the Ethernet frame header. Process 800 then concludes with the scheduling entity 500 filtering a transmission of the DL data packet to the scheduled entity (e.g., UE 400, scheduled entity 1000, etc.) according to the packet filter.

Referring next to FIG. 9, a flow chart is provided, which illustrates an exemplary process for filtering an Unstructured type DL data packet according to some aspects of the disclosure. Similar to processes 700 and 800, it should be appreciated that process 900 may be carried out by the scheduling entity 500 illustrated in FIG. 5, and/or process 900 may be carried out by any suitable apparatus or means for carrying out the functions or algorithm described below.

Process 900 begins at block 902 with the scheduling entity 500 establishing an Unstructured type based PDU session with a scheduled entity (e.g., UE 400, scheduled entity 1000, etc.). Process 900 then proceeds to block 904 where the scheduling entity 500 tags a DL data packet of Unstructured format with an identifier associated with the application that generated the DL data packet. At block 906, the scheduling entity 500 then selects a packet filter based on the application identifier, and process 900 subsequently concludes at block 908 with the scheduling entity 500 filtering a transmission of the DL data packet to the scheduled entity (e.g., UE 400, scheduled entity 1000, etc.) according to the packet filter.

Exemplary Scheduled Entity

Figure 10:
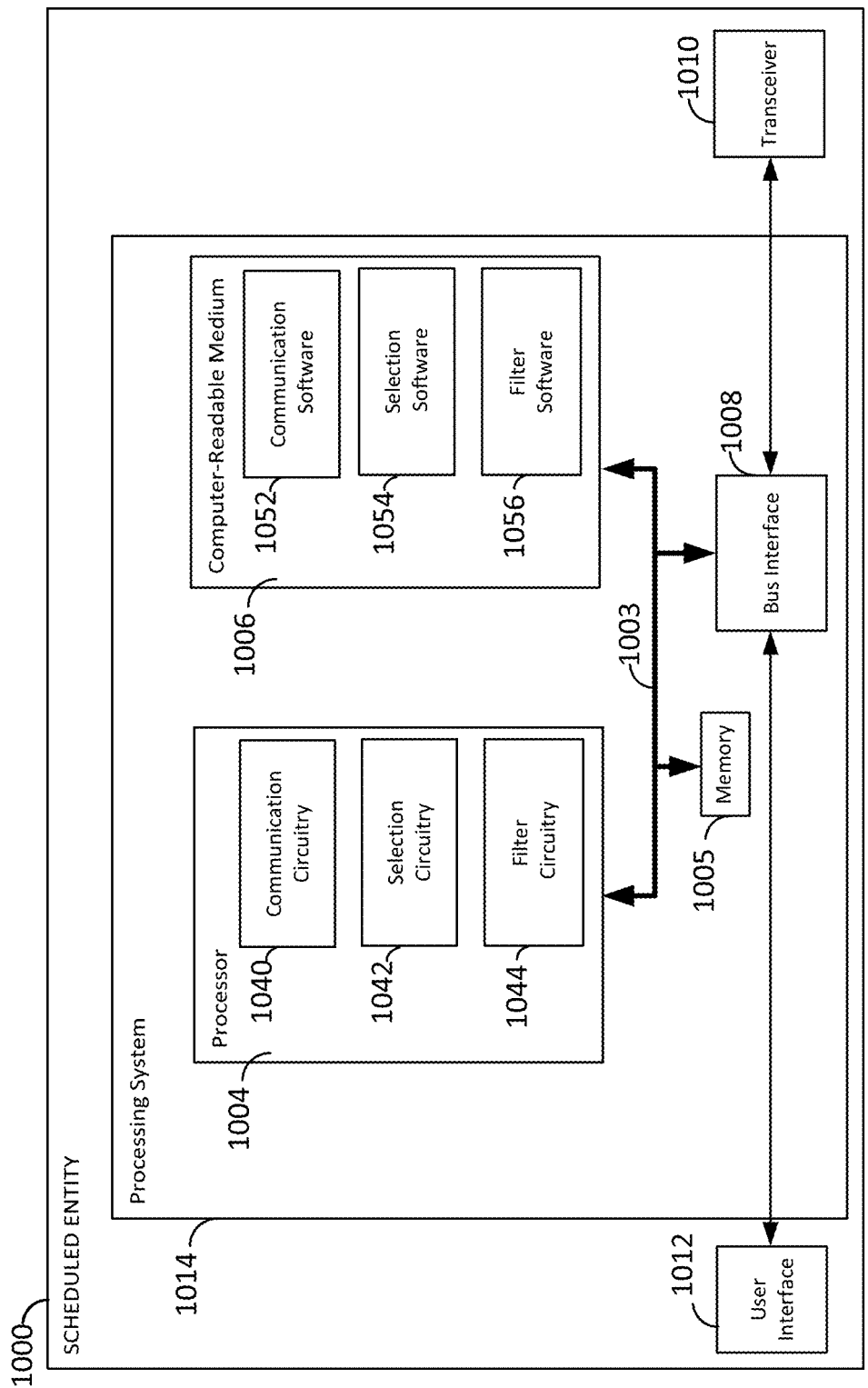
FIG. 10 is a block diagram illustrating an example of a hardware implementation for a scheduled entity apparatus employing a processing system in accordance with some aspects of the present disclosure.

FIG. 10 is a conceptual diagram illustrating an example of a hardware implementation for an exemplary scheduled entity 1000 employing a processing system 1014. In accordance with various aspects of the disclosure, an element, or any portion of an element, or any combination of elements may be implemented with a processing system 1014 that includes one or more processors 1004. For example, the scheduled entity 1000 may be a user equipment (UE) as illustrated in any one or more of FIGS included herein.

The processing system 1014 may be substantially the same as the processing system 514 illustrated in FIG. 5, including a bus interface 1008, a bus 1002, memory 1005, a processor 1004, and a computer-readable medium 1006. Furthermore, the scheduled entity 1000 may include a user interface 1012 and a transceiver 1010 substantially similar to those described above in FIG. 5. That is, the processor 1004, as utilized in a scheduled entity 1000, may be used to implement any one or more of the processes and procedures disclosed herein.

In some aspects of the disclosure, the processor 1004 may include a communication circuitry 1040 configured for various functions, including, for example, to establish a non-internet protocol (IP) based protocol data unit (PDU) session with a scheduling entity (e.g., core network 440, scheduling entity 500, etc.). As illustrated, the processor 1004 may also include a selection circuitry 1042 configured for various functions. For instance, the selection circuitry 1042 may be configured to select a packet filter based on at least one aspect of an uplink (UL) data packet formatted in a non-IP format associated with the non-IP based PDU session. The processor 1004 may further include filter circuitry 1044 configured for various functions, including, for example, to filter a transmission of the DL data packet to a scheduling entity (e.g., core network 440, scheduling entity 500, etc.) according to the packet filter. To this end, it should be appreciated that, the combination of the communication circuitry 1040, the selection circuitry 1042, and the filter circuitry 1044 may be configured to implement one or more of the functions described herein.

Figure 11:
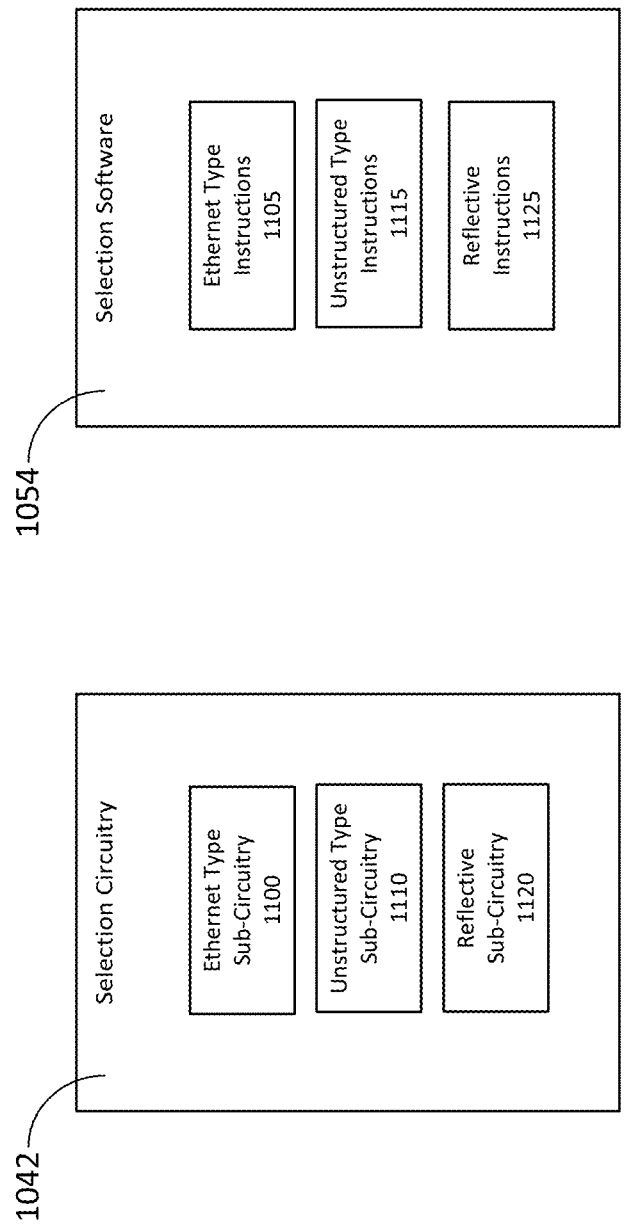
FIG. 11 is a block diagram illustrating exemplary sub-components of the selection circuitry and software illustrated in FIG. 10.

It should be appreciated that various other aspects of scheduled entity 1000 are also contemplated. For instance, to facilitate the selection of packet filters when the non-IP based PDU session is an Ethernet based PDU session such that the UL data packet to be filtered is formatted in an Ethernet format, it is contemplated that the selection circuitry 1042 may comprise Ethernet type sub-circuitry 1100, as illustrated in FIG. 11. In this example, the Ethernet type sub-circuitry 1100 may be configured to select a packet filter based on content included in an Ethernet frame header of the UL data packet. Also, because an Ethernet based PDU session may include IP data, it is further contemplated that the Ethernet type sub-circuitry 1100 may be further configured to select a packet filter based on content included in an IP header of the UL data packet. To this end, it should be appreciated that the filter components based on the contents of an IP header and the filter components based on the contents of an Ethernet frame header may each have the same level of priority (i.e., all criteria in the filter would have to be met, in no particular priority order, for a match to be declared). Alternatively, if an UL data packet associated with an Ethernet based PDU session includes IP data, the Ethernet type sub-circuitry 1100 may be configured to evaluate content included in an IP header of the UL data packet only if at least a portion of the content included in the Ethernet frame header of the UL data packet corresponds to a matching packet filter.

With respect to filtering UL data packets having an Unstructured format during an Unstructured based PDU session, various aspects are also contemplated. For instance, to facilitate the selection of packet filters during such an Unstructured based PDU session, it is contemplated that the selection circuitry 1042 may comprise Unstructured type sub-circuitry 1110, as illustrated in FIG. 11. In a particular example, the Unstructured type sub-circuitry 1110 is configured to select a packet filter based on an identifier associated with an application that generated the UL data packet to be filtered. For instance, the Unstructured type sub-circuitry 1110 may be further configured to facilitate a tagging of the UL data packet with such identifier, wherein the tagging may be performed by any of various components. For example, the Unstructured type sub-circuitry 1110 may be coupled to a modem configured to perform the tagging based on information provided by a high level operating system (HLOS). Alternatively, the Unstructured type sub-circuitry 1110 may be coupled to an HLOS configured to perform the tagging, wherein the HLOS is further configured to transmit the tagged UL data packet to a modem.

In yet another example directed towards unstructured PDU sessions, it is contemplated that an APN may be used. Within such example, the filtering performed by the filter circuitry 1044 comprises requesting an APN when establishing a data connection, wherein the APN corresponds to a particular service or application, and subsequently transmitting UL data packets associated with the particular service or application to the APN.

Aspects directed towards filtering UL data packets when reflective QoS is enabled are also contemplated. For instance, to facilitate the selection of packet filters when reflective QoS is enabled, it is contemplated that the selection circuitry 1042 may comprise reflective sub-circuitry 1120, as illustrated in FIG. 11. In a particular example, the reflective sub-circuitry 1120 is configured to evaluate downlink (DL) data packets received from a network when a reflective QoS is enabled. Moreover, it is contemplated that the reflective sub-circuitry 1120 may be configured to determine whether contents of the DL data packets match with a corresponding packet filter in the scheduled entity 1000. For this example, the reflective sub-circuitry 1120 may then be further configured to create a new packet filter at the scheduled entity 1000 based on the contents of the downlink data packets when a matching packet filter is not found, or utilize an existing packet filter at the scheduled entity 1000 when contents of the existing packet filter match with the contents of the DL data packets. The reflective sub-circuitry 1120 may also be configured to time stamp one of the new packet filter or the existing packet filter, and further configured to delete packet filters based on a corresponding time stamp.

Referring back to FIG. 1000, similar to processor 504, processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. Similar to computer-readable medium 506, computer-readable medium 1006 may be a non-transitory computer-readable medium comprising characteristics that are substantially similar. The computer-readable medium 1006 may reside in the processing system 1014, external to the processing system 1014, or distributed across multiple entities including the processing system 1014. It should also be appreciated that, similar to computer-readable medium 506, computer-readable medium 1006 may be embodied in a computer program product comprising characteristics that are substantially similar.

In one or more examples, the computer-readable storage medium 1006 may include communication software 1052 configured for various functions, including, for example, to establish a non-IP based PDU session with a scheduling entity (e.g., core network 440, scheduling entity 500, etc.). As illustrated, the computer-readable storage medium 1006 may also include selection software 1054 configured for various functions. For instance, the selection software 1054 may be configured to select a packet filter based on at least one aspect of an UL data packet formatted in a non-IP format associated with the non-IP based PDU session. The computer-readable storage medium 1006 may further include filter software 1056 configured for various functions, including, for example, to filter a transmission of the UL data packet to a scheduling entity (e.g., core network 440, scheduling entity 500, etc.) according to the packet filter.

It should be appreciated that various other aspects of computer-readable storage medium 1006 are also contemplated. For instance, to facilitate the selection of packet filters when the non-IP based PDU session is an Ethernet based PDU session such that the UL data packet to be filtered is formatted in an Ethernet format, it is contemplated that the selection software 1054 may comprise Ethernet type instructions 1105, as illustrated in FIG. 11. In this example, the Ethernet type instructions 1105 may include instructions for selecting a packet filter based on content included in an Ethernet frame header of the UL data packet. Also, because an Ethernet based PDU session may include IP data, it is further contemplated that the Ethernet type instructions 1105 may be further include instructions for selecting a packet filter based on content included in an IP header of the UL data packet. To this end, it should be appreciated that the filter components based on the contents of an IP header and the filter components based on the contents of an Ethernet frame header may each have the same level of priority (i.e., all criteria in the filter would have to be met, in no particular priority order, for a match to be declared). Alternatively, if an UL data packet associated with an Ethernet based PDU session includes IP data, the Ethernet type instructions 1105 may include instructions for evaluating content included in an IP header of the UL data packet only if at least a portion of the content included in the Ethernet frame header of the UL data packet corresponds to a matching packet filter.

With respect to filtering UL data packets having an Unstructured format during an Unstructured based PDU session, various aspects are also contemplated. For instance, to facilitate the selection of packet filters during such an Unstructured based PDU session, it is contemplated that the selection software 1054 may comprise Unstructured type instructions 1115, as illustrated in FIG. 11. In a particular example, the Unstructured type instructions 1115 include instructions for selecting a packet filter based on an identifier associated with an application that generated the UL data packet to be filtered. For instance, the Unstructured type instructions 1115 may include instructions to facilitate a tagging of the UL data packet with such identifier, wherein the tagging may be performed by any of various components. For example, the Unstructured type instructions 1115 may include instructions for configuring a modem to perform the tagging based on information provided by a high level operating system (HLOS). Alternatively, the Unstructured type instructions 1115 may include instructions for configuring an HLOS to perform the tagging, wherein the HLOS is further configured to transmit the tagged UL data packet to a modem.

In yet another example directed towards unstructured PDU sessions, it is contemplated that an APN may be used. Within such example, the filtering facilitated by the filter software 1056 comprises requesting an APN when establishing a data connection, wherein the APN corresponds to a particular service or application, and subsequently transmitting UL data packets associated with the particular service or application to the APN.

In a particular configuration, it is also contemplated that the scheduled entity 1000 includes means for establishing a non-IP based PDU session with a scheduling entity (e.g., core network 440, scheduling entity 500, etc.), means for selecting a packet filter based on at least one aspect of an UL data packet formatted in a non-IP format associated with the non-IP based PDU session, and means for filtering a transmission of the UL data packet to the scheduling entity (e.g., core network 440, scheduling entity 500, etc.) according to the packet filter. In one aspect, the aforementioned means may be the processor(s) 1004 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described herein and utilizing, for example, the processes and/or algorithms described in relation to FIGS. 12-15.

Figure 12:
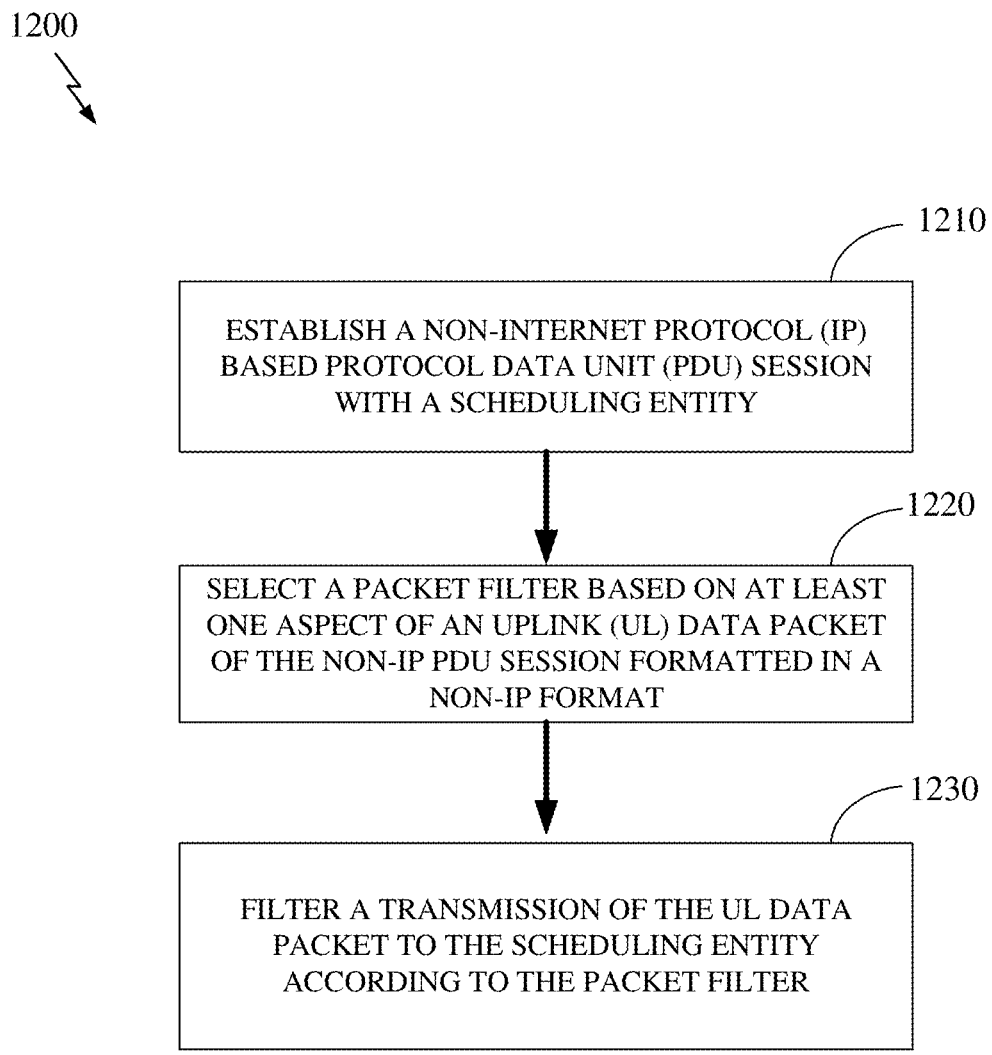
FIG. 12 is a flow chart illustrating an exemplary process for filtering an uplink data packet in accordance with some aspects of the present disclosure.

In FIG. 12, a flow chart is provided, which illustrates an exemplary process for filtering an UL data packet according to some aspects of the disclosure. As described below, some or all illustrated features may be omitted in a particular implementation within the scope of the present disclosure, and some illustrated features may not be required for implementation of all embodiments. In some examples, the process 1200 may be carried out by the scheduled entity 1000 illustrated in FIG. 10. In some examples, the process 1200 may be carried out by any suitable apparatus or means for carrying out the functions or algorithm described below.

Process 1200 begins at block 1210 with the scheduled entity 1000 establishing a non-IP based PDU session with a scheduling entity (e.g., core network 440, scheduling entity 500, etc.). Process 1200 then proceeds to block 1220 where the scheduled entity 1000 selects a packet filter based on at least one aspect of an UL data packet of the non-IP PDU session formatted in a non-IP format. At block 1230, process 1200 then concludes with the scheduled entity 1000 filtering a transmission of the UL data packet to the scheduling entity (e.g., core network 440, scheduling entity 500, etc.) according to the packet filter.

Figure 13:
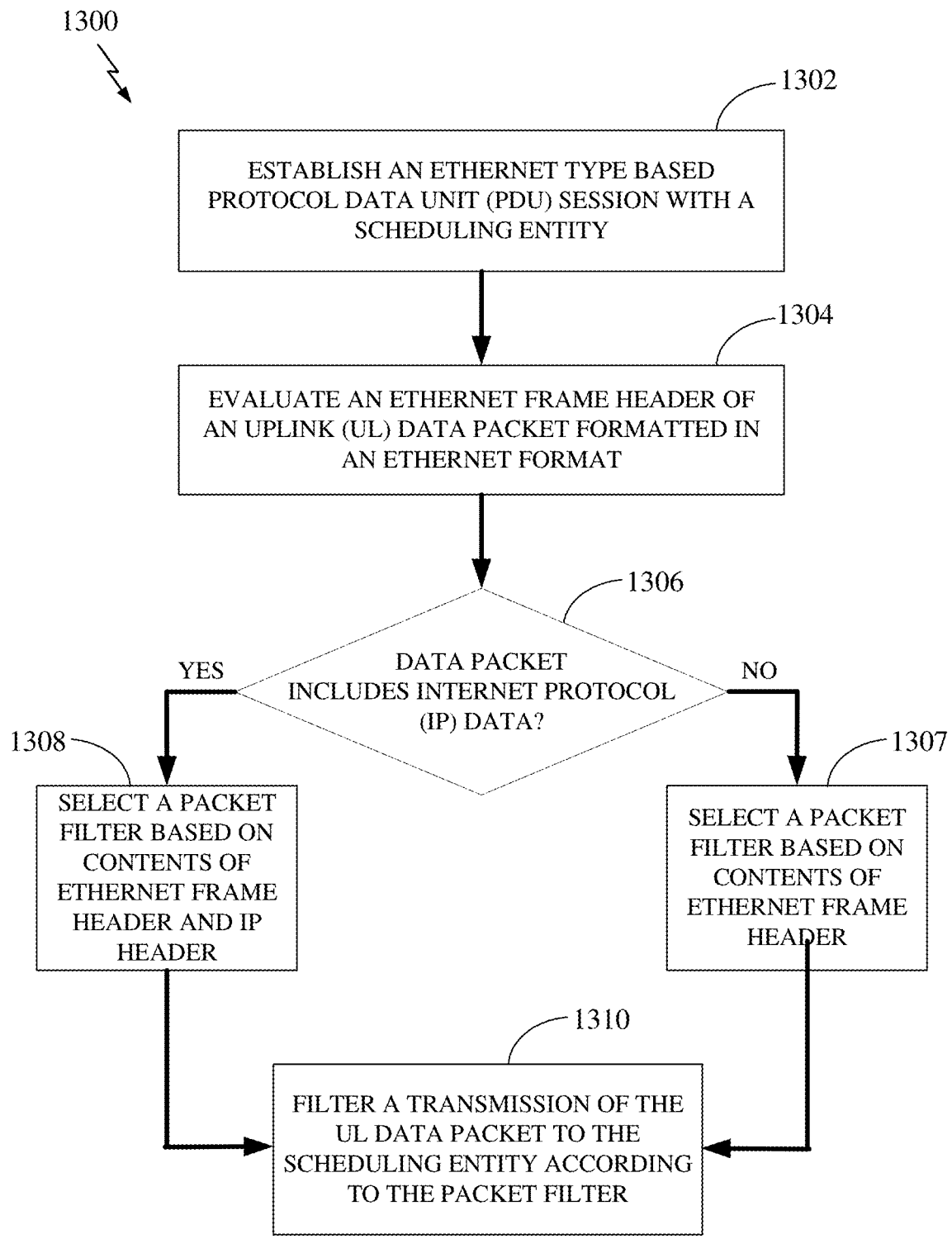
FIG. 13 is a flow chart illustrating an exemplary process for filtering an Ethernet type uplink data packet in accordance with some aspects of the present disclosure.

Referring next to FIG. 13, a flow chart is provided, which illustrates an exemplary process for filtering an Ethernet type UL data packet according to some aspects of the disclosure. Similar to process 1200, it should be appreciated that process 1300 may be carried out by the scheduled entity 1000 illustrated in FIG. 10, and/or process 1300 may be carried out by any suitable apparatus or means for carrying out the functions or algorithm described below.

Process 1300 begins at block 1302 with the scheduled entity 1000 establishing an Ethernet type based PDU session with a scheduling entity (e.g., core network 440, scheduling entity 500, etc.). Process 1300 then proceeds to block 1304 where the scheduled entity 1000 evaluates an Ethernet frame header of an UL data packet formatted in an Ethernet format, and subsequently to block 1306 where a determination is made as to whether the UL data packet includes IP data.

If the UL data packet indeed includes IP data, process 1300 proceeds to block 1308 where the scheduled entity 1000 selects a packet filter based on the contents of the Ethernet frame header and the IP header. Otherwise, if the UL data packet does not include IP data, process 1300 proceeds to block 1307 where the scheduled entity 1000 selects a packet filter based on the contents of the Ethernet frame header. Process 1300 then concludes with the scheduled entity 1000 filtering a transmission of the UL data packet to the scheduling entity (e.g., core network 440, scheduling entity 500, etc.) according to the packet filter.

Figure 14:
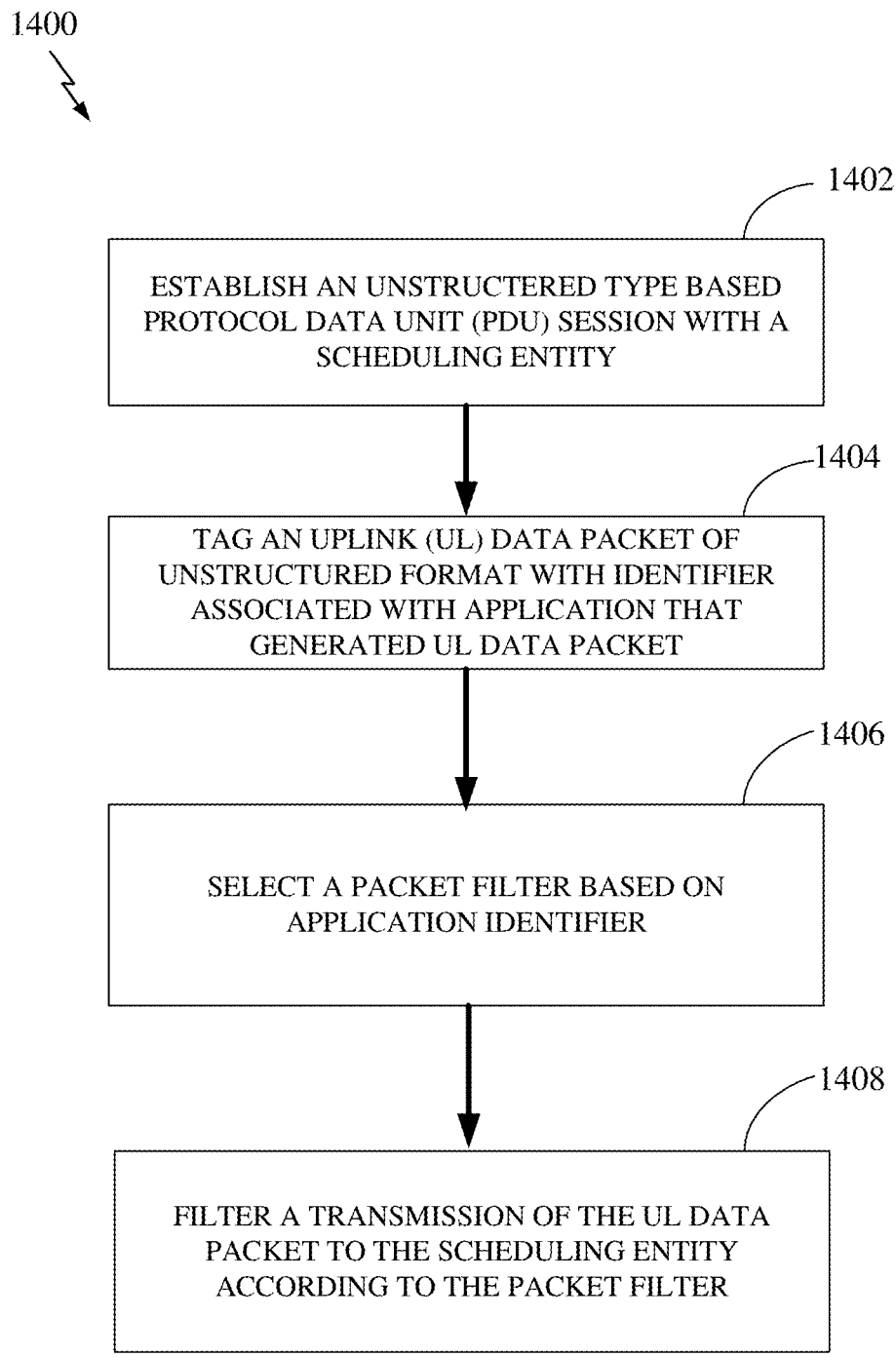
FIG. 14 is a flow chart illustrating an exemplary process for filtering an Unstructured type uplink data packet in accordance with some aspects of the present disclosure.

Referring next to FIG. 14, a flow chart is provided, which illustrates an exemplary process for filtering an Unstructured type UL data packet according to some aspects of the disclosure. Similar to processes 1200 and 1300, it should be appreciated that process 1400 may be carried out by the scheduled entity 1000 illustrated in FIG. 10, and/or process 1400 may be carried out by any suitable apparatus or means for carrying out the functions or algorithm described below.

Process 1400 begins at block 1402 with the scheduled entity 1000 establishing an Unstructured type based PDU session with a scheduling entity (e.g., core network 440, scheduling entity 500, etc.). Process 1400 then proceeds to block 1404 where the scheduled entity 1000 tags a UL data packet of Unstructured format with an identifier associated with the application that generated the UL data packet. At block 1406, the scheduled entity 1000 then selects a packet filter based on the application identifier, and process 1400 subsequently concludes at block 1408 with the scheduled entity 1000 filtering a transmission of the UL data packet to the scheduling entity (e.g., core network 440, scheduling entity 500, etc.) according to the packet filter.

Figure 15:
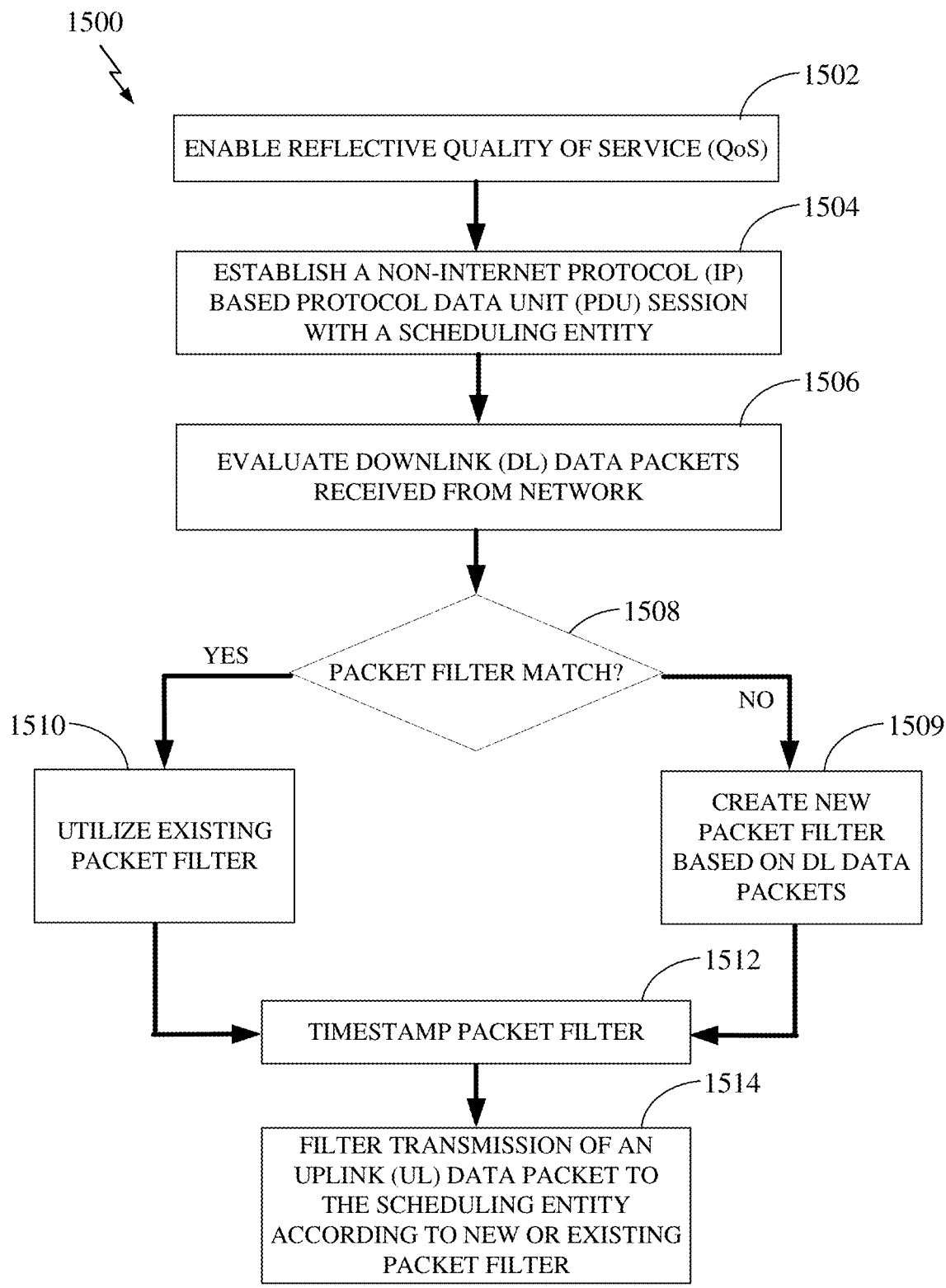
FIG. 15 is a flow chart illustrating an exemplary process for filtering an uplink data packet when reflective Quality of Service (QoS) is enabled in accordance with some aspects of the present disclosure.

Referring next to FIG. 15, a flow chart is provided, which illustrates an exemplary process for filtering an UL data packet when reflective QoS is enabled according to some aspects of the disclosure. Similar to processes 1200, 1300, and 1400, it should be appreciated that process 1500 may be carried out by the scheduled entity 1000 illustrated in FIG. 10, and/or process 1500 may be carried out by any suitable apparatus or means for carrying out the functions or algorithm described below.

Process 1500 begins at block 1502 with the scheduled entity 1000 enabling reflective QoS, and subsequently establishing a non-IP based PDU session with a scheduling entity (e.g., core network 440, scheduling entity 500, etc.) at block 1504. Process 1500 then proceeds to block 1506 where the scheduled entity 1000 evaluates DL data packets received from the scheduling entity (e.g., core network 440, scheduling entity 500, etc.).

At block 1508, the scheduled entity 1000 then determines whether the contents of the DL data packet match with an existing packet filter retrievable by the scheduled entity 1000. If a matching packet filter is indeed found, process 1500 proceeds to block 1510 where the scheduled entity 1000 utilizes the existing packet filter. Otherwise, if a matching packet filter is not found, process 1500 proceeds to block 1509 where the scheduled entity 1000 creates a new packet filter based on the DL data packets. Process 1500 then proceeds to block 1512 where the scheduled entity 1000 time stamps the new/existing packet filter, and subsequently concludes at block 1514 with the scheduled entity 1000 filtering a transmission of the UL data packet to the scheduling entity (e.g., core network 440, scheduling entity 500, etc.) according to the new/existing packet filter.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

Other aspects, features, and embodiments of the present invention will become apparent to those of ordinary skill in the art, upon reviewing the above description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may have been discussed as device, system, or method embodiments it should be understood that such exemplary embodiments can be implemented in various devices, systems, and methods.

What is claimed is:

1. A method of wireless communication comprising:
   establishing a non-internet protocol (IP) based protocol data unit (PDU) session;
   evaluating a downlink data packet formatted in a non-IP format and received from a network when a reflective quality of service (QoS) is enabled, wherein the evaluating comprises:
      determining whether contents of the downlink data packet match with a corresponding packet filter in a user equipment (UE); and
      creating a new packet filter at the UE based on the contents of the downlink data packet when a matching packet filter is not found, or utilizing an existing packet filter at the UE when contents of the existing packet filter match with the contents of the downlink data packet; and
   filtering a transmission of an uplink data packet according to the new packet filter when a matching packet filter is not found, or the existing packet filter when contents of the existing a packet filter match with the contents of the downlink data packet,
   wherein the new packet filter or the existing packet filter is deleted based on a length of time.

2. The method of claim 1, wherein the new packet filter comprises:
   a destination MAC address component set to a source MAC address of the downlink data packet;
   a source MAC address component set to a destination MAC address of the downlink data packet; when an 802.1Q tag is included in the downlink data packet, a VID component set to a VID of the downlink data packet; or
   when an Ethertype field of the downlink data packet is set to at least a threshold value, an Ethertype component set to an Ethertype of the downlink data packet.

3. The method of claim 1, wherein the new packet filter comprises an 802.1Q priority component set to the 802.1Q priority of the downlink data packet when an 802.1Q tag is included in the downlink data packet.

4. A wireless communication device comprising:
   a processor;
   a memory communicatively coupled to the processor;
   a transceiver communicatively coupled to the processor;
   a communication circuitry communicatively coupled to the processor, wherein the communication circuitry is configured to establish a non-internet protocol (IP) based protocol data unit (PDU) session;
   a reflective sub-circuitry configured to evaluate a downlink data packet formatted in a non-IP format and received from a network when a reflective quality of service (QoS) is enabled, and wherein the reflective sub-circuitry is configured to:
      determine whether contents of the downlink data packet match with a corresponding packet filter in a user equipment (UE); and
      create a new packet filter at the UE based on the contents of the downlink data packet when a matching packet filter is not found, or utilize an existing packet filter at the UE when contents of the existing packet filter match with the contents of the downlink data packet; and
   a filter circuitry communicatively coupled to the processor, wherein the filter circuitry is configured to filter a transmission of an uplink data packet according to the new packet filter when a matching packet filter in not found, or the existing packet filter when contents of the existing packet filter match with the contents of the downlink data packet,
   wherein the reflective sub-circuitry is further configured to delete the new packet filter or the existing packet filter based on a length of time.

5. The wireless communication device of claim 4, wherein the new packet filter comprises an 802.1Q priority component set to the 802.1Q priority of the downlink data packet when an 802.1Q tag is included in the downlink data packet.

6. An apparatus for wireless communication, comprising:
   means for establishing a non-internet protocol (IP) based protocol data unit (PDU) session;
   means for evaluating a downlink data packet formatted in a non-IP format and received from a network when a reflective quality of service (QoS) is enabled, and wherein the means for evaluating comprises:
      means for determining whether contents of the downlink data packet match with a corresponding packet filter in a user equipment (UE);
      means for creating a new packet filter at the UE based on the contents of the downlink data packet when a matching packet filter in not found, or utilizing an existing packet filter at the UE when contents of the existing packet filter match with the contents of the downlink data packet; and
   means for filtering a transmission of an uplink data packet according to the new packet filter when a matching packet filter is not found, or the existing packet filter when contents of the existing packet filter match with the contents of the downlink data packet; and
   means for deleting the new packet filter or the existing packet filter based on a length of time.

7. The apparatus of claim 6, wherein the new packet filter comprises:
   a destination MAC address component set to a source MAC address of the downlink data packet;
   a source MAC address component set to a destination MAC address of the downlink data packet;
   when an 802.1Q tag is included in the downlink data packet, a VID component set to a VID of the downlink data packet; or when an Ethertype field of the downlink data packet is set to at least threshold value, an Ethertype component set to an Ethertype of the downlink data packet.

8. The apparatus of claim 6, wherein the new packet filter comprises an 802.1Q priority component set to the 802.1Q of the downlink data packet when an 802.1Q tag is included in the downlink data packet.

9. A non-transitory computer-readable medium storing computer-executable code, comprising code for causing a computer to:
   establish a non-internet protocol (IP) based protocol data unit (PDU) session;
   evaluate a downlink data packet formatted in a non-IP format and received from a network when a reflective quality of service (QoS) is enabled;
   determine whether contents of the downlink data packet match with a corresponding packet filter in a user equipment (UE);
   create a new packet filter at the UE based on the contents of the downlink data packet when a matching packet filter is not found, or utilize an existing packet filter at the UE when contents of the existing packet filter match with the contents of the downlink data packet;
   filter a transmission of an uplink data packet according to the new packet filter when a matching packet filter is not found, or the existing packet filter when contents of the existing packet filter match with the contents of the downlink data packet; and
   delete the new packet filter or the existing packet filter based on a length of time.

10. The non-transitory computer-readable medium of claim 9, wherein the new packet filter comprises an 802.1Q priority component set to the 802.1Q priority of the downlink data packet when an 802.1Q tag is included in the downlink data packet.

11. The wireless communication device of claim 4, wherein the new packet filter comprises:
   a destination MAC address component set to a source MAC address of the downlink data packet;
   a source MAC address component set to a destination MAC address of the downlink data packet;
   when an 802.1Q tag is included in the downlink data packet, a VID component set to a VID of the downlink data packet; or
   when an Ethertype field of the downlink data packet is set to at least a threshold value, an Ethertype component set to an Ethertype of the downlink data packet.

12. The non-transitory computer-readable medium of claim 9, wherein the new packet filter comprises:
   a destination MAC address component set to a source MAC address of the downlink data packet;
   a source MAC address component set to a destination MAC address of the downlink data packet;
   when an 802.1Q tag is included in the downlink data packet, a VID component set to a VID of the downlink data packet; or
   when an Ethertype field of the downlink data packet is set to at least a threshold value, an Ethertype component set to an Ethertype of the downlink data packet.

* * * * *